(12) United States Patent
Asgekar et al.

(10) Patent No.: US 11,620,316 B1
(45) Date of Patent: Apr. 4, 2023

(54) SYSTEMS AND METHODS FOR BUILDING AN INVENTORY DATABASE WITH AUTOMATIC LABELING

(71) Applicant: Pencil Learning Technologies, Inc., Palo Alto, CA (US)

(72) Inventors: Amogh Asgekar, Palo Alto, CA (US); Ayush Agarwal, San Francisco, CA (US)

(73) Assignee: Pencil Learning Technologies, Inc., Palo Alto, CA (US)

( * ) Notice: Subject to any disclaimer, the term of this patent is extended or adjusted under 35 U.S.C. 154(b) by 0 days.

(21) Appl. No.: 17/523,835

(22) Filed: Nov. 10, 2021

(51) Int. Cl.
*G06F 7/00* (2006.01)
*G06F 16/31* (2019.01)
*G09B 5/12* (2006.01)
*G06F 16/35* (2019.01)
*G06F 16/33* (2019.01)

(52) U.S. Cl.
CPC ........ *G06F 16/322* (2019.01); *G06F 16/3344* (2019.01); *G06F 16/35* (2019.01); *G09B 5/12* (2013.01)

(58) Field of Classification Search
CPC .... G06F 16/322; G06F 16/35; G06F 16/3344; G06F 16/24578; G06F 16/285; G06F 16/55; G06F 16/583; G06V 20/41; G06V 20/70; G06K 9/6259; G06N 20/00; G06N 5/22; G06N 3/08; G06N 3/0454; G04N 21/23418
See application file for complete search history.

(56) References Cited

U.S. PATENT DOCUMENTS

| | | | | |
|---|---|---|---|---|
| 10,783,167 B1* | 9/2020 | Dutta | ................ | G06F 16/24578 |
| 2012/0269436 A1* | 10/2012 | Mensink | .............. | G06V 10/764 |
| | | | | 382/180 |
| 2013/0114902 A1* | 5/2013 | Sukthankar | ...... | H04N 21/23418 |
| | | | | 382/190 |
| 2020/0401851 A1* | 12/2020 | Mau | ........................ | G06F 16/55 |

* cited by examiner

*Primary Examiner* — Mohammad A Sana
(74) *Attorney, Agent, or Firm* — Volpe Koenig P.C.; Daniel E. Rose

(57) ABSTRACT

The present disclosure provides systems and methods for building an inventory database with automatic labeling. A system can maintain a hierarchical concept tree including labels. Each of the labels is associated with a set of attributes and a respective embedding. The system can receive, from a provider device, a request to generate labels for an item of media content. The request can include a request attribute. The system can generate, using a gated categorical model, document embeddings for the item of media content. The system can select a subset of the labels based on the request attribute. The system can determine a respective label score for each label of the subset of the labels based on the document embeddings and the respective embedding of the label. The system can provide a selected label of the subset of the labels based on the respective label score of the selected label.

20 Claims, 7 Drawing Sheets

SYSTEMS AND METHODS FOR BUILDING AN INVENTORY DATABASE WITH AUTOMATIC LABELING

BACKGROUND

Educators typically create and format teaching media as part of a lesson plan. It can be challenging to efficiently create and categorize media content in multiple different formats that is localized or targeted for various teaching environments and contexts.

SUMMARY

Conventionally, educators that provide teaching media often categorize, label, and store content in a hierarchical manner. These teaching media hierarchies are often defined by a lesson plan, or a syllabus. In general, when an educational content provider creates content for a particular lesson, the educational content provider manually associates, or otherwise assigns, one or more labels to the teaching content so that it is easily accessible by students. These labels can correspond to a category of the content, content subject matter, content type, or content difficulty. When an educational content provider wants to incorporate existing teaching content into a lesson plan or syllabus, or wants to create new, more up-to-date teaching content for a syllabus, lesson plan, or topic hierarchy, the educational content provider must manually assign labels to the educational content. However, this process can be tedious and produce inconsistent results across different educational content providers. Therefore, it would be advantageous for a system to automatically build an inventory database of teaching media by automatically labeling each item of teaching media according to its semantic meaning.

The systems and methods of the present disclosure solve this and other issues by providing techniques for building an inventory database of teaching media by automatically assigning labels to content based on a semantic representation of the content. At least one aspect of the present disclosure is directed to a method of building an inventory database with automatic labeling. The method can be performed, for example, by one or more processors coupled to memory. The method can include maintaining a hierarchical concept tree comprising a plurality of labels. Each of the plurality of labels can be associated with a set of attributes and a respective embedding. The method can include receiving, from a provider device, a request to generate labels for an item of media content. The request can provide a request attribute. The method can include generating, using a gated categorical model, a plurality of document embeddings for the item of media content. The method can include selecting a subset of the plurality of labels based on the request attribute. The method can include determining a respective label score for each label of the subset of the plurality of labels based on the plurality of document embeddings and the respective embedding of the label. The method can include providing a selected label of the subset of the plurality of labels based on the respective label score of the selected label.

In some implementations, the method can include training, using a set of training data comprising a plurality of documents each associated with a respective label of the plurality of labels, the gated categorical model. In some implementations, receiving the request to generate labels for the item of media content further comprises receiving, from the provider device, the item of media content. In some implementations, receiving the request to generate labels for the item of media content further comprises storing the item of media content in a database. In some implementations, each of the plurality of labels is stored in a database indexed by the set of attributes associated with each label of the plurality of labels. In some implementations, selecting the subset of the plurality of labels further comprises executing a query in the database over the set of attributes of each label of the plurality of labels using the request attribute.

In some implementations, determining the respective label score for each label of the plurality of labels further comprises calculating, for each label of the plurality of labels, a similarity between the plurality of document embeddings and the respective embedding of the label. In some implementations, determining the respective label score for each label of the plurality of labels further comprises storing, for each label of the plurality of labels, the similarity as the respective label score in association with the item of media content and the label. In some implementations, maintaining the plurality of labels further comprises receiving, from the provider device, a syllabus defining a hierarchy of topics. In some implementations, maintaining the plurality of labels further comprises extracting the plurality of labels from the syllabus based on the hierarchy of topics.

In some implementations, the method can include determining, using a semantic model, the set of attributes associated with each label of the plurality of labels based on the syllabus. In some implementations, providing the selected label of the subset of the plurality of labels further comprises providing, to the provider device, a second subset of the subset of the plurality of labels, the respective each label of the second subset being greater than other labels of the subset of the plurality of labels. In some implementations, providing the selected label of the subset of the plurality of labels further comprises receiving, from the provider device, a selection of the selected label from the second subset. In some implementations, providing the selected label of the subset of the plurality of labels further comprises storing an association between the selected label and the item of media content.

In some implementations, providing the selected label further comprises ranking the subset of the plurality of labels based on the respective label score of each label of the subset of the plurality of labels. In some implementations, providing the selected label further comprises selecting the selected label from the subset of the plurality of labels based on the ranking. In some implementations, providing the selected label further comprises presenting the selected label in a user interface at the provider device.

At least one other aspect of the present disclosure is directed to a system for building an inventory database with automatic labeling. The system can include one or more processors coupled to memory. The system can maintain a hierarchical concept tree comprising a plurality of labels. Each of the plurality of labels can be associated with a set of attributes and a respective embedding. The system can receive, from a provider device, a request to generate labels for an item of media content, the request providing a request attribute. The system can generate, using a gated categorical model, a plurality of document embeddings for the item of media content. The system can select a subset of the plurality of labels based on the request attribute. The system can determine a respective label score for each label of the subset of the plurality of labels based on the plurality of document embeddings and the respective embedding of the label. The system can provide a selected label of the subset of the plurality of labels based on the respective label score of the selected label.

In some implementations, the system can train, using a set of training data comprising a plurality of documents each associated with a respective label of the plurality of labels, the gated categorical model. In some implementations, the system can receive the request to generate labels for the item of media content by receiving, from the provider device, the item of media content. In some implementations, the system can receive the request to generate labels for the item of media content by storing the item of media content in a database. In some implementations, each of the plurality of labels is stored in a database indexed by the set of attributes associated with each label of the plurality of labels. In some implementations, the system can select the subset of the plurality of labels by executing a query in the database over the set of attributes of each label of the plurality of labels using the request attribute.

In some implementations, the system can determine the respective label score for each label of the plurality of labels by calculating, for each of the plurality of labels, a similarity between the plurality of document embeddings and the respective embedding of the label. In some implementations, the system can determine the respective label score for each label of the plurality of labels by storing, for each label of the plurality of labels, the similarity as the respective label score in association with the item of media content and the label. In some implementations, the system can maintain the plurality of labels by receiving, from the provider device, a syllabus defining a hierarchy of topics. In some implementations, the system can maintain the plurality of labels by extracting the plurality of labels from the syllabus based on the hierarchy of topics.

In some implementations, the system can determine, using a semantic model, the set of attributes associated with each label of the plurality of labels based on the syllabus. In some implementations, the system can provide the selected label of the subset of the plurality of labels by providing, to the provider device, a second subset of the subset of the plurality of labels. In some implementations, the respective label of the second subset being greater than other labels of the subset of the plurality of labels. In some implementations, the system can provide the selected label of the subset of the plurality of labels by receiving, from the provider device, a selection of the selected label from the second subset. In some implementations, the system can provide the selected label of the subset of the plurality of labels by storing an association between the selected label and the item of media content.

In some implementations, the system can provide the selected label by ranking the subset of the plurality of labels based on the respective label score of each label of the subset of the plurality of labels. In some implementations, the system can provide the selected label by selecting the selected label from the subset of the plurality of labels based on the ranking. In some implementations, the system can provide the selected label by presenting, by the one or more processors, the selected label in a user interface at the provider device.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification. Aspects can be combined and it will be readily appreciated that features described in the context of one aspect of the invention can be combined with other aspects. Aspects can be implemented in any convenient form. For example, by appropriate computer programs, which may be carried on appropriate carrier media (computer readable media), which may be tangible carrier media (e.g. disks) or intangible carrier media (e.g. communications signals). Aspects may also be implemented using suitable apparatus, which may take the form of programmable computers running computer programs arranged to implement the aspect. As used in the specification and in the claims, the singular form of 'a', 'an', and 'the' include plural referents unless the context clearly dictates otherwise.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Below are detailed descriptions of various concepts related to, and implementations of, techniques, approaches, methods, apparatuses, and systems for generating deeply integrated presentation gadgets. The various concepts introduced above and discussed in greater detail below may be implemented in any of numerous ways, as the described concepts are not limited to any particular manner of implementation. Examples of specific implementations and applications are provided primarily for illustrative purposes For purposes of reading the description of the various implementations below, the following descriptions of the sections of the Specification and their respective contents may be helpful Section A describes a network environment and computing environment which may be useful for practicing embodiments described herein; and Section B describes systems and methods for building an inventory database with automatic labeling.

A. Computing and Network Environment

Figure 1A:
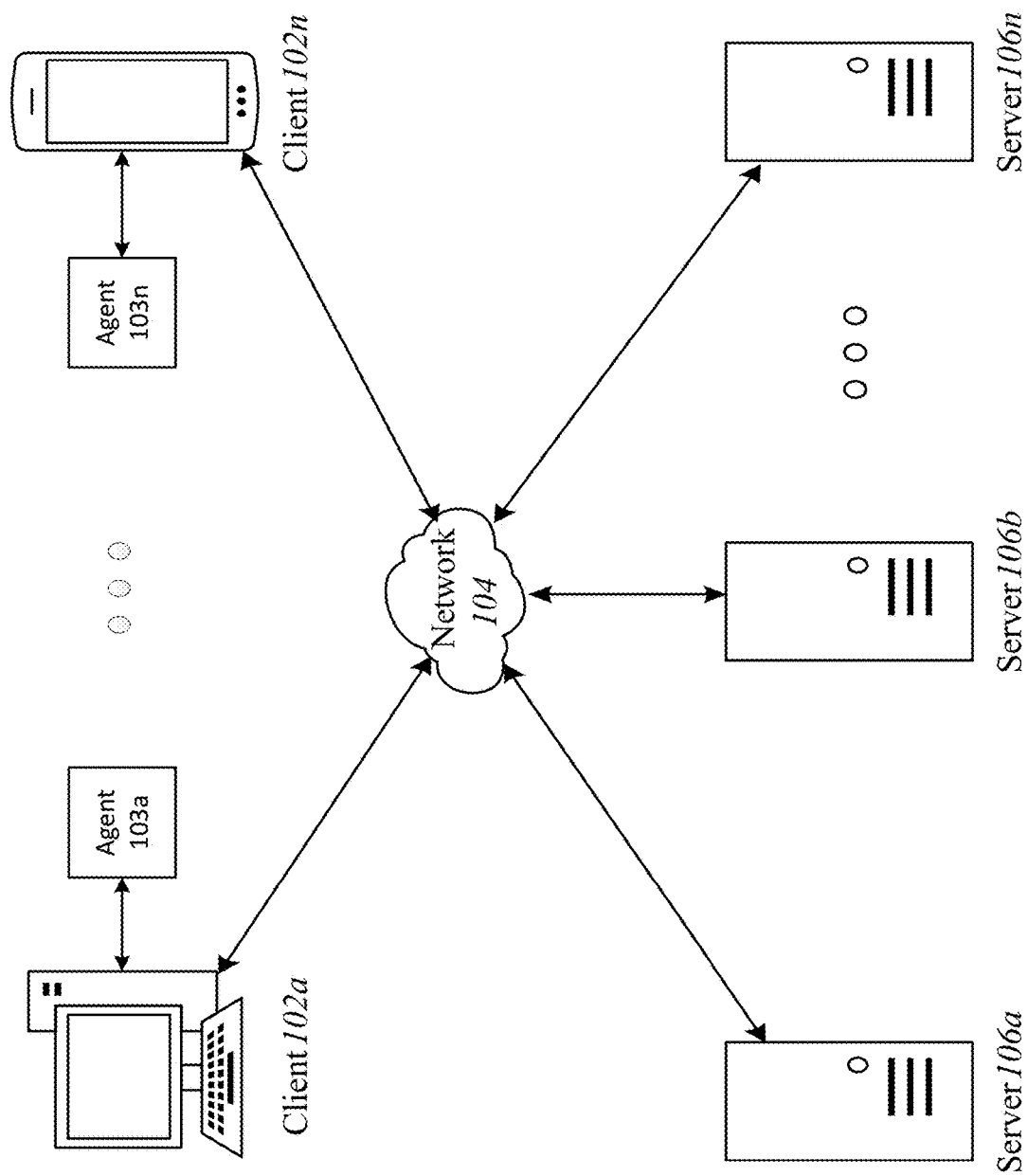
FIG. 1A is a block diagram depicting an embodiment of a network environment comprising a client device in communication with a server device.

Prior to discussing specific implements of the various aspects of this technical solution, it may be helpful to describe aspects of the operating environment as well as associated system components (e.g., hardware elements) in connection with the methods and systems described herein. Referring to FIG. 1A, an embodiment of a network environment is depicted. In brief overview, the network environment includes one or more clients 102a-102n (also generally referred to as local machine(s) 102, client(s) 102, client node(s) 102, client machine(s) 102, client computer(s) 102, client device(s) 102, endpoint(s) 102, or endpoint node(s) 102) in communication with one or more agents 103a-103n and one or more servers 106a-106n (also generally referred to as server(s) 106, node 106, or remote machine(s) 106) via one or more networks 104. In some embodiments, a client 102 has the capacity to function as both a client node seeking access to resources provided by a server and as a server providing access to hosted resources for other clients 102a-102n.

Although FIG. 1A shows a network 104 between the clients 102 and the servers 106, the clients 102 and the servers 106 may be on the same network 104. In some embodiments, there are multiple networks 104 between the clients 102 and the servers 106. In one of these embodiments, a network 104' (not shown) may be a private network and a network 104 may be a public network. In another of these embodiments, a network 104 may be a private network and a network 104' a public network. In still another of these embodiments, networks 104 and 104' may both be private networks.

The network 104 may be connected via wired or wireless links. Wired links may include Digital Subscriber Line (DSL), coaxial cable lines, or optical fiber lines. The wireless links may include BLUETOOTH, Wi-Fi, Worldwide Interoperability for Microwave Access (WiMAX), an infrared channel or satellite band. The wireless links may also include any cellular network standards used to communicate among mobile devices, including standards that qualify as 1G, 2G, 3G, or 4G. The network standards may qualify as one or more generations of mobile telecommunication standards by fulfilling a specification or standards such as the specifications maintained by International Telecommunication Union. The 3G standards, for example, may correspond to the International Mobile Telecommunications-2000 (IMT-2000) specification, and the 4G standards may correspond to the International Mobile Telecommunications Advanced (IMT-Advanced) specification. Examples of cellular network standards include AMPS, GSM, GPRS, UMTS, LTE, LTE Advanced, Mobile WiMAX, and WiMAX-Advanced. Cellular network standards may use various channel access methods e.g. FDMA, TDMA, CDMA, or SDMA. In some embodiments, different types of data may be transmitted via different links and standards. In other embodiments, the same types of data may be transmitted via different links and standards.

The network 104 may be any type and/or form of network. The geographical scope of the network 104 may vary widely and the network 104 can be a body area network (BAN), a personal area network (PAN), a local-area network (LAN), e.g. Intranet, a metropolitan area network (MAN), a wide area network (WAN), or the Internet. The topology of the network 104 may be of any form and may include, e.g., any of the following: point-to-point, bus, star, ring, mesh, or tree. The network 104 may be an overlay network which is virtual and sits on top of one or more layers of other networks 104'. The network 104 may be of any such network topology as known to those ordinarily skilled in the art capable of supporting the operations described herein. The network 104 may utilize different techniques and layers or stacks of protocols, including, e.g., the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol. The TCP/IP internet protocol suite may include application layer, transport layer, internet layer (including, e.g., IPv6), or the link layer. The network 104 may be a type of a broadcast network, a telecommunications network, a data communication network, or a computer network.

In some embodiments, the system may include multiple, logically-grouped servers 106. In one of these embodiments, the logical group of servers may be referred to as a server farm 38 (not shown) or a machine farm 38. In another of these embodiments, the servers 106 may be geographically dispersed. In other embodiments, a machine farm 38 may be administered as a single entity. In still other embodiments, the machine farm 38 includes a plurality of machine farms 38. The servers 106 within each machine farm 38 can be heterogeneous—one or more of the servers 106 or machines 106 can operate according to one type of operating system platform (e.g., WINDOWS NT, manufactured by Microsoft Corp. of Redmond, Wash.), while one or more of the other servers 106 can operate on according to another type of operating system platform (e.g., Unix, Linux, or Mac OS X).

In one embodiment, servers 106 in the machine farm 38 may be stored in high-density rack systems, along with associated storage systems, and located in an enterprise data center. In this embodiment, consolidating the servers 106 in this way may improve system manageability, data security, the physical security of the system, and system performance by locating servers 106 and high performance storage systems on localized high performance networks. Centralizing the servers 106 and storage systems and coupling them with advanced system management tools allows more efficient use of server resources.

The servers 106 of each machine farm 38 do not need to be physically proximate to another server 106 in the same machine farm 38. Thus, the group of servers 106 logically grouped as a machine farm 38 may be interconnected using a wide-area network (WAN) connection or a metropolitan-area network (MAN) connection. For example, a machine farm 38 may include servers 106 physically located in different continents or different regions of a continent, country, state, city, campus, or room. Data transmission speeds between servers 106 in the machine farm 38 can be increased if the servers 106 are connected using a local-area network (LAN) connection or some form of direct connection. Additionally, a heterogeneous machine farm 38 may include one or more servers 106 operating according to a type of operating system, while one or more other servers 106 execute one or more types of hypervisors rather than operating systems. In these embodiments, hypervisors may be used to emulate virtual hardware, partition physical hardware, virtualize physical hardware, and execute virtual machines that provide access to computing environments, allowing multiple operating systems to run concurrently on a host computer. Native hypervisors may run directly on the host computer. Hypervisors may include VMware ESX/ESXi, manufactured by VMWare, Inc., of Palo Alto, Calif.; the Xen hypervisor, an open source product whose development is overseen by Citrix Systems, Inc.; the HYPER-V hypervisors provided by Microsoft or others. Hosted hypervisors may run within an operating system on a second software level. Examples of hosted hypervisors may include VMware Workstation and VIRTUALBOX.

Management of the machine farm 38 may be decentralized. For example, one or more servers 106 may comprise components, subsystems and modules to support one or more management services for the machine farm 38. In one of these embodiments, one or more servers 106 provide functionality for management of dynamic data, including techniques for handling failover, data replication, and increasing the robustness of the machine farm 38. Each server 106 may communicate with a persistent store and, in some embodiments, with a dynamic store.

Server 106 may be a file server, application server, web server, proxy server, appliance, network appliance, gateway, gateway server, virtualization server, deployment server, SSL VPN server, or firewall. In one embodiment, server 106 may be referred to as a remote machine or a node. In another embodiment, a plurality of nodes may be in the path between any two communicating servers.

Figure 1B:
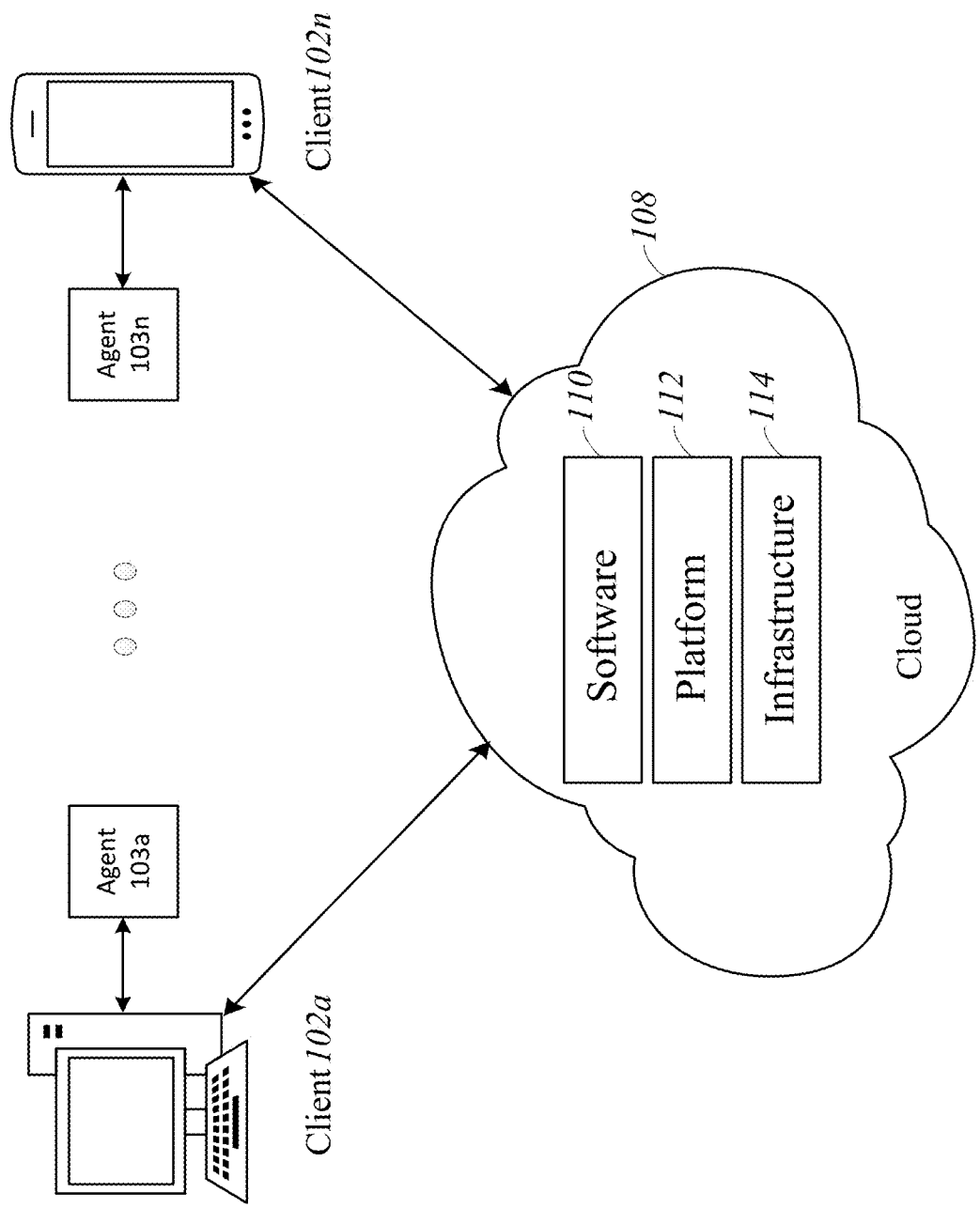
FIG. 1B is a block diagram depicting a cloud computing environment comprising a client device in communication with cloud service providers.

Referring to FIG. 1B, a cloud computing environment is depicted. A cloud computing environment may provide client 102 with one or more resources provided by a network environment. The cloud computing environment may include one or more clients 102a-102n, in communication with respective agents 103a-103n and with the cloud 108 over one or more networks 104. Clients 102 may include, e.g., thick clients, thin clients, and zero clients. A thick client may provide at least some functionality even when disconnected from the cloud 108 or servers 106. A thin client or a zero client may depend on the connection to the cloud 108 or server 106 to provide functionality. A zero client may depend on cloud 108 or other networks 104 or servers 106 to retrieve operating system data for the client device. The cloud 108 may include back end platforms, e.g., servers 106, storage, server farms or data centers.

The cloud 108 may be public, private, or hybrid. Public clouds may include public servers 106 that are maintained by third parties to the clients 102 or the owners of the clients. The servers 106 may be located off-site in remote geographical locations as disclosed above or otherwise. Public clouds may be connected to the servers 106 over a public network. Private clouds may include private servers 106 that are physically maintained by clients 102 or owners of clients. Private clouds may be connected to the servers 106 over a private network 104. Hybrid clouds 108 may include both the private and public networks 104 and servers 106.

The cloud 108 may also include a cloud based delivery, e.g. Software as a Service (SaaS) 110, Platform as a Service (PaaS) 112, and Infrastructure as a Service (IaaS) 114. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Wash., RACKSPACE CLOUD provided by Rackspace US, Inc., of San Antonio, Tex., Google Compute Engine provided by Google Inc. of Mountain View, Calif., or RIGHTSCALE provided by RightScale, Inc., of Santa Barbara, Calif. PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Wash., Google App Engine provided by Google Inc., and HEROKU provided by Heroku, Inc. of San Francisco, Calif. SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, Calif., or OFFICE 365 provided by Microsoft Corporation. Examples of SaaS may also include data storage providers, e.g. DROPBOX provided by Dropbox, Inc. of San Francisco, Calif., Microsoft SKYDRIVE provided by Microsoft Corporation, Google Drive provided by Google Inc., or Apple ICLOUD provided by Apple Inc. of Cupertino, Calif.

Clients 102 may access IaaS resources with one or more IaaS standards, including, e.g., Amazon Elastic Compute Cloud (EC2), Open Cloud Computing Interface (OCCI), Cloud Infrastructure Management Interface (CIMI), or OpenStack standards. Some IaaS standards may allow clients access to resources over HTTP, and may use Representational State Transfer (REST) protocol or Simple Object Access Protocol (SOAP). Clients 102 may access PaaS resources with different PaaS interfaces. Some PaaS interfaces use HTTP packages, standard Java APIs, JavaMail API, Java Data Objects (JDO), Java Persistence API (JPA), Python APIs, web integration APIs for different programming languages including, e.g., Rack for Ruby, WSGI for Python, or PSGI for Perl, or other APIs that may be built on REST, HTTP, XML, or other protocols. Clients 102 may access SaaS resources through the use of web-based user interfaces, provided by a web browser (e.g. GOOGLE CHROME, Microsoft INTERNET EXPLORER, or Mozilla Firefox provided by Mozilla Foundation of Mountain View, Calif.). Clients 102 may also access SaaS resources through smartphone or tablet applications, including, e.g., Salesforce Sales Cloud, or Google Drive app. Clients 102 may also access SaaS resources through the client operating system, including, e.g., Windows file system for DROPBOX.

In some embodiments, access to IaaS, PaaS, or SaaS resources may be authenticated. For example, a server or authentication server may authenticate a user via security certificates, HTTPS, or API keys. API keys may include various encryption standards such as, e.g., Advanced Encryption Standard (AES). Data resources may be sent over Transport Layer Security (TLS) or Secure Sockets Layer (SSL).

Figure 1C:
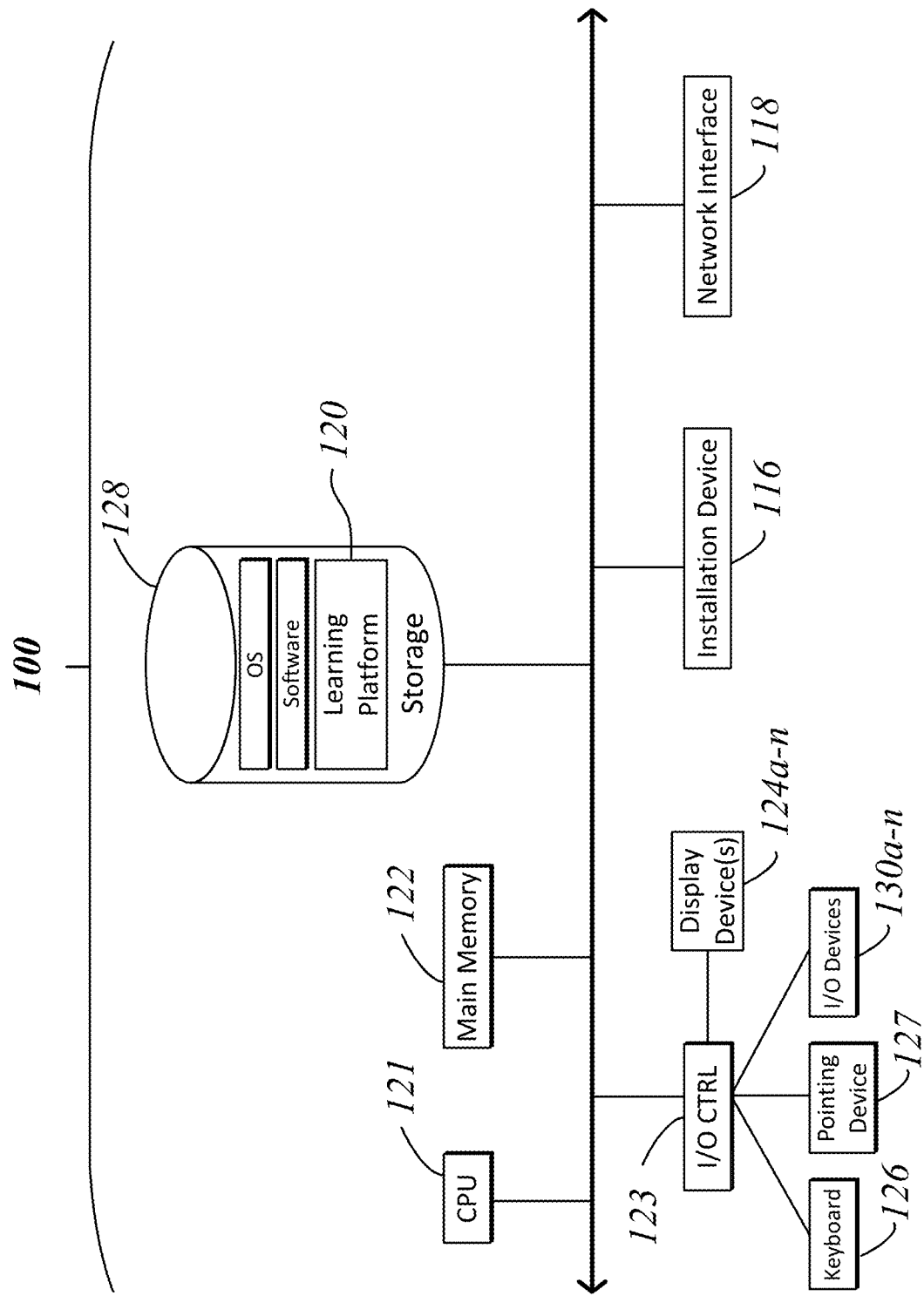
FIGS. 1C and 1D are block diagrams depicting embodiments of computing devices useful in connection with the methods and systems described herein.
Figure 1D:
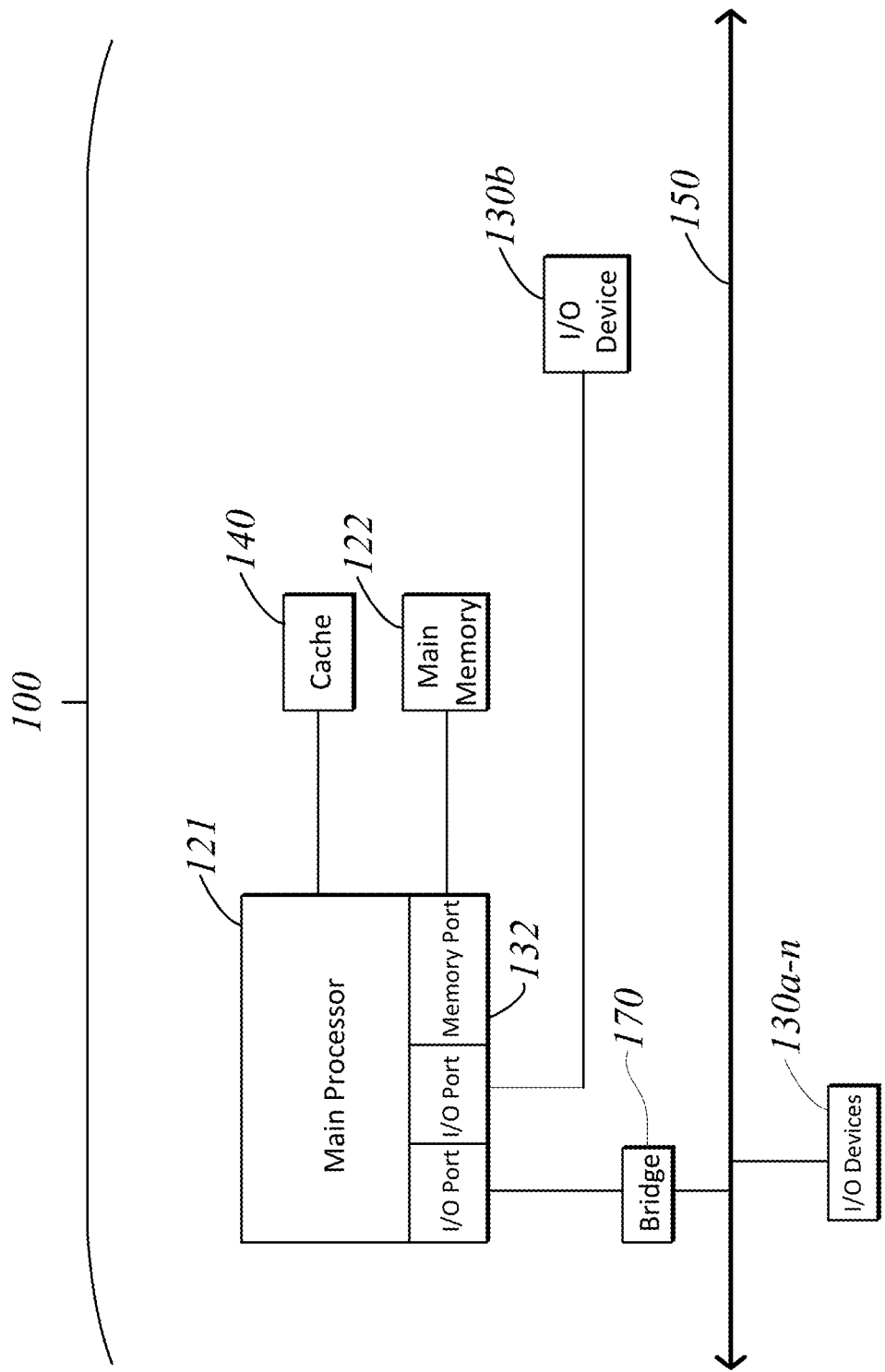

The client 102 and server 106 may be deployed as and/or executed on any type and form of computing device, e.g. a computer, network device or appliance capable of communicating on any type and form of network and performing the operations described herein. FIGS. 1C and 1D depict block diagrams of a computing device 100 useful for practicing an embodiment of the client 102 or a server 106. As shown in FIGS. 1C and 1D, each computing device 100 includes a central processing unit 121, and a main memory unit 122. As shown in FIG. 1C, a computing device 100 may include a storage device 128, an installation device 116, a network interface 118, an I/O controller 123, display devices 124a-124n, a keyboard 126 and a pointing device 127, e.g. a mouse. The storage device 128 may include, without limitation, an operating system, software, and learning platform 120, which can implement any of the features of the educational content system 205 described herein below in conjunction with FIG. 2. As shown in FIG. 1D, each computing device 100 may also include additional optional elements, e.g. a memory port 132, a bridge 170, one or more input/output devices 130a-130n (generally referred to using reference numeral 130), and a cache memory 140 in communication with the central processing unit 121.

The central processing unit 121 is any logic circuitry that responds to and processes instructions fetched from the main memory unit 122. In many embodiments, the central processing unit 121 is provided by a microprocessor unit, e.g.: those manufactured by Intel Corporation of Mountain View, Calif.; those manufactured by Motorola Corporation of Schaumburg, Ill.; the ARM processor and TEGRA system on a chip (SoC) manufactured by Nvidia of Santa Clara, Calif.; the POWER7 processor, those manufactured by International Business Machines of White Plains, N.Y.; or those manufactured by Advanced Micro Devices of Sunnyvale, Calif. The computing device 100 may be based on any of these processors, or any other processor capable of operating as described herein. The central processing unit 121 may utilize instruction level parallelism, thread level parallelism, different levels of cache, and multi-core processors. A multi-core processor may include two or more processing units on a single computing component. Examples of multi-core processors include the AMD PHENOM IIX2, INTEL CORE i5, INTEL CORE i7, and INTEL CORE i9.

Main memory unit 122 may include one or more memory chips capable of storing data and allowing any storage location to be directly accessed by the microprocessor 121. Main memory unit 122 may be volatile and faster than storage 128 memory. Main memory units 122 may be Dynamic random access memory (DRAM) or any variants, including static random access memory (SRAM), Burst SRAM or SynchBurst SRAM (BSRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Single Data Rate Synchronous DRAM (SDR SDRAM), Double Data Rate SDRAM (DDR SDRAM), Direct Rambus DRAM (DRDRAM), or Extreme Data Rate DRAM (XDR DRAM). In some embodiments, the main memory 122 or the storage 128 may be non-volatile; e.g., non-volatile read access memory (NVRAM), flash memory non-volatile static RAM (nvSRAM), Ferroelectric RAM (FeRAM), Magnetoresistive RAM (MRAM), Phase-change memory (PRAM), conductive-bridging RAM (CBRAM), Silicon-Oxide-Nitride-Oxide-Silicon (SONOS), Resistive RAM (RRAM), Racetrack, Nano-RAM (NRAM), or Millipede memory. The main memory 122 may be based on any of the above described memory chips, or any other available memory chips capable of operating as described herein. In the embodiment shown in FIG. 1C, the processor 121 communicates with main memory 122 via a system bus 150 (described in more detail below). FIG. 1D depicts an embodiment of a computing device 100 in which the processor communicates directly with main memory 122 via a memory port 132. For example, in FIG. 1D the main memory 122 may be DRDRAM.

FIG. 1D depicts an embodiment in which the main processor 121 communicates directly with cache memory 140 via a secondary bus, sometimes referred to as a backside bus. In other embodiments, the main processor 121 communicates with cache memory 140 using the system bus 150. Cache memory 140 typically has a faster response time than main memory 122 and is typically provided by SRAM, BSRAM, or EDRAM. In the embodiment shown in FIG. 1D, the processor 121 communicates with various I/O devices 130 via a local system bus 150. Various buses may be used to connect the central processing unit 121 to any of the I/O devices 130, including a PCI bus, a PCI-X bus, or a PCI-Express bus, or a NuBus. For embodiments in which the I/O device is a video display 124, the processor 121 may use an Advanced Graphics Port (AGP) to communicate with the display 124 or the I/O controller 123 for the display 124. FIG. 1D depicts an embodiment of a computer 100 in which the main processor 121 communicates directly with I/O device 130b or other processors 121' via HYPERTRANSPORT, RAPIDIO, or INFINIBAND communications technology. FIG. 1D also depicts an embodiment in which local busses and direct communication are mixed: the processor 121 communicates with I/O device 130a using a local interconnect bus while communicating with I/O device 130b directly.

A wide variety of I/O devices 130a-130n may be present in the computing device 100. Input devices may include keyboards, mice, trackpads, trackballs, touchpads, touch mice, multi-touch touchpads and touch mice, microphones, multi-array microphones, drawing tablets, cameras, single-lens reflex camera (SLR), digital SLR (DSLR), CMOS sensors, accelerometers, infrared optical sensors, pressure sensors, magnetometer sensors, angular rate sensors, depth sensors, proximity sensors, ambient light sensors, gyroscopic sensors, or other sensors. Output devices may include video displays, graphical displays, speakers, headphones, inkjet printers, laser printers, and 3D printers.

Devices 130a-130n may include a combination of multiple input or output devices, including, e.g., Microsoft KINECT, Nintendo Wiimote for the WII, Nintendo WII U GAMEPAD, or Apple IPHONE. Some devices 130a-130n allow gesture recognition inputs through combining some of the inputs and outputs. Some devices 130a-130n provide for facial recognition which may be utilized as an input for different purposes including authentication and other commands. Some devices 130a-130n provides for voice recognition and inputs, including, e.g., Microsoft KINECT, SIRI for IPHONE by Apple, Google Now or Google Voice Search.

Additional devices 130a-130n have both input and output capabilities, including, e.g., haptic feedback devices, touch-screen displays, or multi-touch displays. Touchscreen, multi-touch displays, touchpads, touch mice, or other touch sensing devices may use different technologies to sense touch, including, e.g., capacitive, surface capacitive, projected capacitive touch (PCT), in-cell capacitive, resistive, infrared, waveguide, dispersive signal touch (DST), in-cell optical, surface acoustic wave (SAW), bending wave touch (BWT), or force-based sensing technologies. Some multi-touch devices may allow two or more contact points with the surface, allowing advanced functionality including, e.g., pinch, spread, rotate, scroll, or other gestures. Some touch-screen devices, including, e.g., Microsoft PIXELSENSE or Multi-Touch Collaboration Wall, may have larger surfaces, such as on a table-top or on a wall, and may also interact with other electronic devices. Some I/O devices 130a-130n, display devices 124a-124n or group of devices may be augment reality devices. The I/O devices may be controlled by an I/O controller 123 as shown in FIG. 1C. The I/O controller may control one or more I/O devices, such as, e.g., a keyboard 126 and a pointing device 127, e.g., a mouse or optical pen. Furthermore, an I/O device may also provide storage and/or an installation medium 116 for the computing device 100. In still other embodiments, the computing device 100 may provide USB connections (not shown) to receive handheld USB storage devices. In further embodiments, an I/O device 130 may be a bridge between the system bus 150 and an external communication bus, e.g. a USB bus, a SCSI bus, a FireWire bus, an Ethernet bus, a Gigabit Ethernet bus, a Fibre Channel bus, or a Thunderbolt bus.

In some embodiments, display devices 124a-124n may be connected to I/O controller 123. Display devices may include, e.g., liquid crystal displays (LCD), thin film transistor LCD (TFT-LCD), blue phase LCD, electronic papers (e-ink) displays, flexile displays, light emitting diode displays (LED), digital light processing (DLP) displays, liquid crystal on silicon (LCOS) displays, organic light-emitting diode (OLED) displays, active-matrix organic light-emitting diode (AMOLED) displays, liquid crystal laser displays, time-multiplexed optical shutter (TMOS) displays, or 3D displays. Examples of 3D displays may use, e.g. stereoscopy, polarization filters, active shutters, or autostereoscopic. Display devices 124a-124n may also be a head-mounted display (HMD). In some embodiments, display devices 124a-124n or the corresponding I/O controllers 123 may be controlled through or have hardware support for OPENGL or DIRECTX API or other graphics libraries.

In some embodiments, the computing device 100 may include or connect to multiple display devices 124a-124n, which each may be of the same or different type and/or form. As such, any of the I/O devices 130a-130n and/or the I/O controller 123 may include any type and/or form of suitable hardware, software, or combination of hardware and software to support, enable or provide for the connection and use of multiple display devices 124a-124n by the computing device 100. For example, the computing device 100 may include any type and/or form of video adapter, video card, driver, and/or library to interface, communicate, connect or otherwise use the display devices 124a-124n. In one embodiment, a video adapter may include multiple connectors to interface to multiple display devices 124a-124n. In other embodiments, the computing device 100 may include multiple video adapters, with each video adapter connected to one or more of the display devices 124a-124n. In some embodiments, any portion of the operating system of the computing device 100 may be configured for using multiple displays 124a-124n. In other embodiments, one or more of the display devices 124a-124n may be provided by one or more other computing devices 100a or 100b connected to the computing device 100, via the network 104. In some embodiments software may be designed and constructed to use another computer's display device as a second display device 124a for the computing device 100. For example, in one embodiment, an Apple iPad may connect to a computing device 100 and use the display of the device 100 as an additional display screen that may be used as an extended desktop. One ordinarily skilled in the art will recognize and appreciate the various ways and embodiments that a computing device 100 may be configured to have multiple display devices 124a-124n.

Referring again to FIG. 1C, the computing device 100 may comprise a storage device 128 (e.g. one or more hard disk drives or redundant arrays of independent disks) for storing an operating system or other related software, and for storing application software programs such as any program related to the learning platform 120. Examples of storage device 128 include, e.g., hard disk drive (HDD); optical drive including CD drive, DVD drive, or BLU-RAY drive; solid-state drive (SSD); USB flash drive; or any other device suitable for storing data. Some storage devices may include multiple volatile and non-volatile memories, including, e.g., solid state hybrid drives that combine hard disks with solid state cache. Some storage devices 128 may be non-volatile, mutable, or read-only. Some storage device 128 may be internal and connect to the computing device 100 via a bus 150. Some storage device 128 may be external and connect to the computing device 100 via a I/O device 130 that provides an external bus. Some storage device 128 may connect to the computing device 100 via the network interface 118 over a network 104, including, e.g., the Remote Disk for MACBOOK AIR by Apple. Some client devices 100 may not require a non-volatile storage device 128 and may be thin clients or zero clients 102. Some storage device 128 may also be used as an installation device 116, and may be suitable for installing software and programs. Additionally, the operating system and the software can be run from a bootable medium, for example, a bootable CD, e.g. KNOPPIX, a bootable CD for GNU/Linux that is available as a GNU/Linux distribution from knoppix.net.

Client device 100 may also install software or applications from an application distribution platform. Examples of application distribution platforms include the App Store for iOS provided by Apple, Inc., the Mac App Store provided by Apple, Inc., GOOGLE PLAY for Android OS provided by Google Inc., Chrome Webstore for CHROME OS provided by Google Inc., and Amazon Appstore for Android OS and KINDLE FIRE provided by Amazon.com, Inc. An application distribution platform may facilitate installation of software on a client device 102. An application distribution platform may include a repository of applications on a server 106 or a cloud 108, which the clients 102a-102n may access over a network 104. An application distribution platform may include applications developed and provided by various developers. A user of a client device 102 may select, purchase and/or download an application via the application distribution platform.

Furthermore, the computing device 100 may include a network interface 118 to interface to the network 104 through a variety of connections including, but not limited to, standard telephone lines LAN or WAN links (e.g., 802.11, T1, T3, Gigabit Ethernet, Infiniband), broadband connections (e.g., ISDN, Frame Relay, ATM, Gigabit Ethernet, Ethernet-over-SONET, ADSL, VDSL, BPON, GPON, fiber optical including FiOS), wireless connections, or some combination of any or all of the above. Connections can be established using a variety of communication protocols (e.g., TCP/IP, Ethernet, ARCNET, SONET, SDH, Fiber Distributed Data Interface (FDDI), IEEE 802.11a/b/g/n/ac CDMA, GSM, WiMax and direct asynchronous connections). In one embodiment, the computing device 100 communicates with other computing devices 100' via any type and/or form of gateway or tunneling protocol e.g. Secure Socket Layer (SSL) or Transport Layer Security (TLS), or the Citrix Gateway Protocol manufactured by Citrix Systems, Inc. of Ft. Lauderdale, Fla. The network interface 118 may comprise a built-in network adapter, network interface card, PCMCIA network card, EXPRESSCARD network card, card bus network adapter, wireless network adapter, USB network adapter, modem or any other device suitable for interfacing the computing device 100 to any type of network capable of communication and performing the operations described herein.

A computing device 100 of the sort depicted in FIGS. 1B and 1C may operate under the control of an operating system, which controls scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: WINDOWS 2000, WINDOWS Server 2012, WINDOWS CE, WINDOWS Phone, WINDOWS XP, WINDOWS VISTA, and WINDOWS 7, WINDOWS RT, and WINDOWS 8 all of which are manufactured by Microsoft Corporation of Redmond, Wash.; MAC OS and iOS, manufactured by Apple, Inc. of Cupertino, Calif.; and Linux, a freely-available operating system, e.g. Linux Mint distribution ("distro") or Ubuntu, distributed by Canonical Ltd. of London, United Kingdom; or Unix or other Unix-like derivative operating systems; and Android, designed by Google, of Mountain View, Calif., among others. Some operating systems, including, e.g., the CHROME OS by Google, may be used on zero clients or thin clients, including, e.g., CHROMEBOOKS.

The computer system 100 can be any workstation, telephone, desktop computer, laptop or notebook computer, netbook, ULTRABOOK, tablet, server, handheld computer, mobile telephone, smartphone or other portable telecommunications device, media playing device, a gaming system, mobile computing device, or any other type and/or form of computing, telecommunications or media device that is capable of communication. The computer system 100 has sufficient processor power and memory capacity to perform the operations described herein. In some embodiments, the computing device 100 may have different processors, operating systems, and input devices consistent with the device. The Samsung GALAXY smartphones, e.g., operate under the control of Android operating system developed by Google, Inc. GALAXY smartphones receive input via a touch interface.

In some embodiments, the computing device 100 is a gaming system. For example, the computer system 100 may comprise a PLAYSTATION 3, a PLAYSTATION 4, PLAYSTATION 5, or PLAYSTATION PORTABLE (PSP), or a PLAYSTATION VITA device manufactured by the Sony Corporation of Tokyo, Japan, a NINTENDO DS, NINTENDO 3DS, NINTENDO WII, NINTENDO WII U, or a NINTENDO SWITCH device manufactured by Nintendo Co., Ltd., of Kyoto, Japan, an XBOX 360, an XBOX ONE, an XBOX ONE S, XBOX ONE X, XBOX SERIES S, or an XBOX SERIES X device manufactured by the Microsoft Corporation of Redmond, Wash.

In some embodiments, the computing device 100 is a digital audio player such as the Apple IPOD, IPOD Touch, and IPOD NANO lines of devices, manufactured by Apple Computer of Cupertino, Calif. Some digital audio players may have other functionality, including, e.g., a gaming system or any functionality made available by an application from a digital application distribution platform. For example, the IPOD Touch may access the Apple App Store. In some embodiments, the computing device 100 is a portable media player or digital audio player supporting file formats including, but not limited to, MP3, WAV, M4A/AAC, WMA Protected AAC, AIFF, Audible audiobook, Apple Lossless audio file formats and .mov, .m4v, and .mp4 MPEG-4 (H.264/MPEG-4 AVC) video file formats.

In some embodiments, the computing device 100 is a tablet e.g. the IPAD line of devices by Apple; GALAXY TAB family of devices by Samsung; or KINDLE FIRE, by Amazon.com, Inc. of Seattle, Wash. In other embodiments, the computing device 100 is an eBook reader, e.g. the KINDLE family of devices by Amazon.com, or NOOK family of devices by Barnes & Noble, Inc. of New York City, N.Y.

In some embodiments, the communications device 102 includes a combination of devices, e.g. a smartphone combined with a digital audio player or portable media player. For example, one of these embodiments is a smartphone, e.g. the IPHONE family of smartphones manufactured by Apple, Inc.; a Samsung GALAXY family of smartphones manufactured by Samsung, Inc.; or a Motorola DROID family of smartphones. In yet another embodiment, the communications device 102 is a laptop or desktop computer equipped with a web browser and a microphone and speaker system, e.g. a telephony headset. In these embodiments, the communications devices 102 are web-enabled and can receive and initiate phone calls. In some embodiments, a laptop or desktop computer is also equipped with a webcam or other video capture device that enables video chat and video call.

In some embodiments, the status of one or more machines 102, 106 in the network 104 is monitored, generally as part of network management. In one of these embodiments, the status of a machine may include an identification of load information (e.g., the number of processes on the machine, CPU and memory utilization), of port information (e.g., the number of available communication ports and the port addresses), or of session status (e.g., the duration and type of processes, and whether a process is active or idle). In another of these embodiments, this information may be identified by a plurality of metrics, and the plurality of metrics can be applied at least in part towards decisions in load distribution, network traffic management, and network failure recovery as well as any aspects of operations of the present solution described herein. Aspects of the operating environments and components described above will become apparent in the context of the systems and methods disclosed herein.

B. Building an Inventory Database with Automatic Labeling

Conventionally, educators that provide teaching media often categorize, label, and store content in a hierarchical manner. These teaching media hierarchies are often defined by a lesson plan, or a syllabus. In general, when an educational content provider creates content for a particular lesson, the educational content provider manually associates, or otherwise assigns, one or more labels to the teaching content so that it is easily accessible by students. These labels can correspond to a category of the content, content subject matter, content type, or content difficulty. When an educational content provider wants to incorporate existing teaching content into a lesson plan or syllabus, or wants to create new, more up-to-date teaching content for a syllabus, lesson plan, or topic hierarchy, the educational content provider must manually assign labels to the educational content. However, this process can be tedious and produce inconsistent results across different educational content providers.

Further, one of the biggest impediments to content management is properly classifying it for later retrieval. Placing materials within a folder structure or tagging the content with the correct labels or categorical identifiers is laborious, leading many workspaces to be devoid of organization despite the best intentions. The systems and methods described herein provide semantic analysis of teaching media, which allows for regularized processing of any type of teaching content, regardless of subject or language. The systems and methods of the present disclosure can classify the teaching within a user selected taxonomy using the semantic analysis of the content and a semantic processing of the user selected taxonomy.

The systems and methods of this technical solution can label pieces of educational content with multiple topic tags, or labels, each of which can be derived from a disjointed hierarchical concept tree. The hierarchical concept tree can be generated, for example, based on a user-selected taxonomy, which can be provided in the form of a syllabus. One approach to solving these issues includes training and applying a large feed-forward deep neural network to input text based data, and then using the output from a softmax layer to assign a classification label. However, this approach can struggle when classification labels must be selected from only a small sample. For example, an approach to image classification (similar to text analysis provided above, etc.) includes providing each of the pixels in an image as input to a deep convolutional neural network (CNN), of which the final layer is a softmax layer, potentially over a million or more labels. Now, during inference, if the requirement was to classify the image with labels only of items that are available in a particular category (e.g., a particular grocery store, etc.) then this approach is insufficient.

Another approach includes outputting a probability distribution over the entire label space, and then filtering out unneeded labels and sorting the rest. This approach is flawed, however, because it is extremely computationally expensive to do over all labels, but more importantly, softmax layers trained over a large label-space tend to be accurate only at the head of the distribution, rather than beyond the top few results. This is due to the way the loss function is computed during training, and the way negative samples are chosen for large label-spaces. Another approach to this issue includes building a separate classifier for every subset of labels that will be queried for. Then, during inference, the corresponding model can first be selected based on the query, and then the input is fed through the selected model to achieve desired results. However, approach creates a proliferation of models, which can grow to unmanageable proportions to account for all possible query sets. For example, a 1 gigabyte (GB) model and 10000 query sets would result in 10 terabytes (TB) of models during inference. Further, breaking up the training data in such a way leads to tiny training data sets for each model, which will result in overfitting, and therefore prevents any benefits of transfer learning that would have otherwise been possible.

A third way of solving these issues is by concatenating the query that represents the set of labels to the input and then providing that as input to a classification model. However, a challenge with this approach is now the input space over which the model needs to be trained is not just K, where K is cardinality of the input space, but K*Q, where Q is also the cardinality of the query space. This product space makes the model require a possibly impracticable amount of data to train. Moreover, such a model can only allow queries of the types it has "seen" (e.g., used as training data, etc.) during training. It therefore cannot accommodate a dynamically constructed set of labels, especially if training data cannot be generated for the model.

The systems and methods of this technical solution address the issues outlined above by building a gated categorical model for content classification and labeling. The systems and methods can train the model as follows. For every input X with set of labels Y, an embedding can be generated using an unsupervised model. The unsupervised model can be, for example, a language model implemented as a transformer model, or the unsupervised model can be an image model trained as a CNN, among other types of models that can generate embeddings based on content. The output of the unsupervised, or embedding generating model, can be a dense, compact, and lower dimensional representation embedding of the input. In some implementations, the model used to generate the embeddings is a supervised model.

The embedding generated using the input can then be provided as input to a deep neural network (DNN) that is trained to output a result that is equivalent to embedding the labels in the same embedding space as the documents. A similarity can be computed between a label and an item of media content using the embeddings.

The technique used by the systems and methods described herein to add labels to the database are described below. First, each label L can be associated with a set of attributes $A_1, \ldots A_N$ and an embedding $E_1$. Each label can be stored in a database in association with its corresponding embeddings and attributes. Then, in the database, each label can be identified by N indexes, one over each attribute of the label. The above technique can be executed each time a new label is created for the system (e.g., provided by a provider device, etc.). To automatically generate labels for an item of media content, the item of media content can be passed through the model to generate its embeddings. Next, an input query over label attributes can be generated. For example, for an image recognition algorithm, the user only may specify in a request to classify an item of media content that they only want labels from a set of animals.

Then, the media content embedding can be augmented into the query, which can then be executed over the database. The labels can then be scored, based on the query, as follows. For each query predicate in the query, a list of labels can be retrieved based on the index specified in the query predicate. Then, for each label retrieved, a score can be computed as a function of the embedding of the label and the embedding for the item of media content, which can be stored as the score for that label. Then, the retrieved labels can be sorted by their associated label scores, and a predetermined number of top ranking labels can be returned in response to the request to classify the item of media content. Thus, the systems and methods described herein can automatically categorize and label any item of media content, even across different formats or modalities. The processes described herein above do not suffer from the previously identified issues, and therefore the systems and methods described herein provide a technical improvement to dynamic labeling systems for content, where the labels are optimized for later retrieval.

Figure 2:
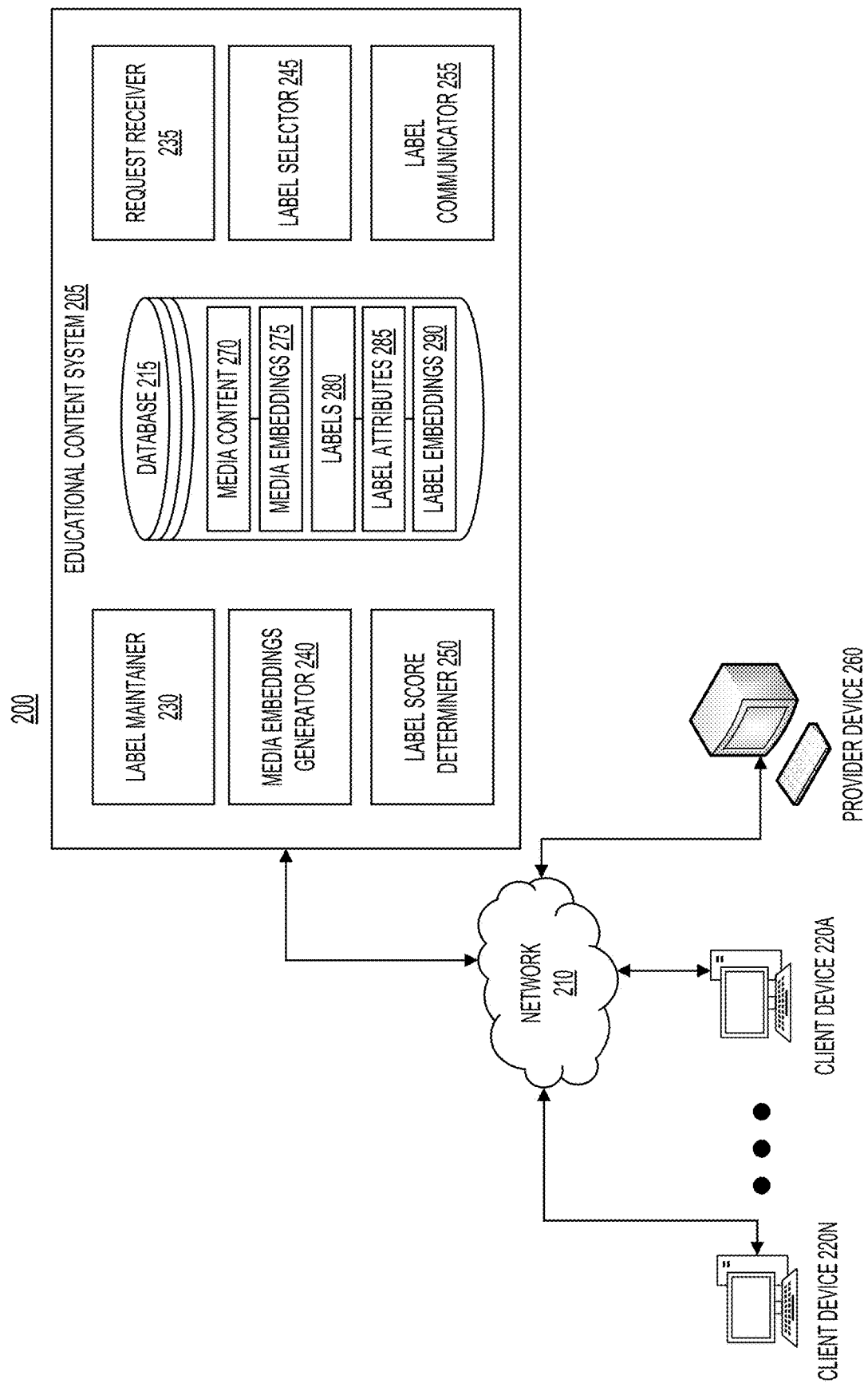
FIG. 2 is a block diagram of an example system for building an inventory database with automatic labeling, in accordance with one or more implementations.

Referring now to FIG. 2, illustrated is a block diagram of an example system 200 for generating deeply integrated presentation gadgets, in accordance with one or more implementations. The system 200 can include at least one educational content system 205, at least one network 210, one or more client devices 220A-220N (sometimes generally referred to as client device(s) 220), and at least one provider device 260. The educational content system 205 can include at least at least one label maintainer 230, at least one request receiver 235, at least one media embeddings generator 240, at least one label selector 245, at least one label score determiner 250, at least one label communicator 255, and at least one database 215. The database 215 can include media content 270, one or more media embeddings 275, one or more labels 280, one or more label attributes 285, and one or more label embeddings 290. In some implementations, the database 215 can be external to the educational content system 205, for example, as a part of a cloud computing system or an external computing device in communication with the devices (e.g., the educational content system 205, the client devices 220, the provider device 260, etc.) of the system 200 via the network 210.

Each of the components (e.g., the educational content system 205, the network 210, the client devices 220, the provider device 260, the label maintainer 230, the request receiver 235, the media embeddings generator 240, the label selector 245, the label score determiner 250, the label communicator 255, the database 215, etc.) of the system 200 can be implemented using the hardware components or a combination of software with the hardware components of a computing system, such as the computing system 100 detailed herein in conjunction with FIGS. 1A-1D, or any other computing system described herein. Each of the components of the educational content system 205 can perform any of the functionalities detailed herein.

The educational content system 205 can include at least one processor and a memory, e.g., a processing circuit. The memory can store processor-executable instructions that, when executed by the processor, cause the processor to perform one or more of the operations described herein. The processor may include a microprocessor, an application-specific integrated circuit (ASIC), a field-programmable gate array (FPGA), etc., or combinations thereof. The memory may include, but is not limited to, electronic, optical, magnetic, or any other storage or transmission device capable of providing the processor with program instructions. The memory may further include a floppy disk, CD-ROM, DVD, magnetic disk, memory chip, ASIC, FPGA, read-only memory (ROM), random-access memory (RAM), electrically erasable programmable ROM (EEPROM), erasable programmable ROM (EPROM), flash memory, optical media, or any other suitable memory from which the processor can read instructions. The instructions may include code from any suitable computer programming language. The educational content system 205 can include one or more computing devices or servers that can perform various functions as described herein. The educational content system 205 can include any or all of the components and perform any or all of the functions of the computer system 100 described herein in conjunction with FIGS. 1A-1D.

The network 210 can include computer networks such as the Internet, local, wide, metro or other area networks, intranets, satellite networks, other computer networks such as voice or data mobile phone communication networks, or any combinations thereof. The educational content system 205 of the system 200 can communicate via the network 210, for example, with one or more client devices 220, or with the provider device 260. The network 210 may be any form of computer network that can relay information between the educational content system 205, the one or more client devices 220, the provider device 260, and one or more information sources, such as web servers or external databases, amongst others. In some implementations, the network 210 may include the Internet and/or other types of data networks, such as a local area network (LAN), a wide area network (WAN), a cellular network, a satellite network, or other types of data networks. The network 210 may also include any number of computing devices (e.g., computers, servers, routers, network switches, etc.) that are configured to receive and/or transmit data within the network 210. The network 210 may further include any number of hardwired and/or wireless connections. Any or all of the computing devices described herein (e.g., the educational content system 205, the one or more client devices 220, the provider device 260, the computer system 100, etc.) may communicate wirelessly (e.g., via WiFi, cellular, radio, etc.) with a transceiver that is hardwired (e.g., via a fiber optic cable, a CAT5 cable, etc.) to other computing devices in the network 210. Any or all of the computing devices described herein (e.g., the educational content system 205, the one or more client devices 220, the provider device 260, the computer system 100, etc.) may also communicate wirelessly with the computing devices of the network 210 via a proxy device (e.g., a router, network switch, or gateway). In some implementations, the network 210 can be similar to or can include the network 104 or the cloud 108 described herein above in conjunction with FIGS. 1A and 1B.

Each of the client devices 220 can include at least one processor and a memory, e.g., a processing circuit. The memory can store processor-executable instructions that, when executed by the processor, cause the processor to perform one or more of the operations described herein. The processor can include a microprocessor, an application-specific integrated circuit (ASIC), a field-programmable gate array (FPGA), etc., or combinations thereof. The memory can include, but is not limited to, electronic, optical, magnetic, or any other storage or transmission device capable of providing the processor with program instructions. The memory can further include a floppy disk, CD-ROM, DVD, magnetic disk, memory chip, ASIC, FPGA, read-only memory (ROM), random-access memory (RAM), electrically erasable programmable ROM (EEPROM), erasable programmable ROM (EPROM), flash memory, optical media, or any other suitable memory from which the processor can read instructions. The instructions can include code from any suitable computer programming language. The client devices 220 can include one or more computing devices or servers that can perform various functions as described herein. The one or more client devices 220 can include any or all of the components and perform any or all of the functions of the computer system 100 described herein in conjunction with FIGS. 1A-1D. The client devices 220 can be, or can be similar to, the client devices 102 described herein above in conjunction with FIGS. 1A-1D.

Each client device 220 can include, but is not limited to, a television device, a mobile device, smart phone, personal computer, a laptop, a gaming device, a kiosk, or any other type of computing device. Each client device 220 can be implemented using hardware or a combination of software and hardware. Each client device 220 can include a display device that can provide visual information, such as information presented as a result of executing instructions stored in the memory of the client device 220. The display device can include an liquid-crystal display (LCD) device, an organic light-emitting diode (OLED) display, a light-emitting diode (LED) display, a bi-stable display (e.g., e-ink, etc.), amongst others. The display device can present one or more user interfaces to various regions of the display in accordance with the functionalities described herein. In some implementations, the display device can include interactive elements, such as a capacitive or resistive touch sensor. Thus, the display device can be an interactive display (e.g., a touchscreen, a display, etc.), and can include one or more input/output (I/O) devices or interfaces. Each client device 220 can further include or be in communication with (e.g., via a communications bus coupled to the processors of the client devices 220, etc.) one or more input devices, such as a mouse, a keyboard, or digital keypad, among others.

The display can be used to present one or more applications as described herein, such as web browsers or native applications. The display can include a border region (e.g., side border, top border, bottom border). The inputs received via the input/output devices (e.g., touchscreen, mouse, keyboard, etc.) can be detected by one or more event listeners, and indicate interactions with one or more user interface elements presented on the display device of the client devices 220. The interactions can result in interaction data, which can be stored and transmitted by the processing circuitry of the client device 220 to other computing devices, such as those in communication with the client devices 220. The interaction data can include, for example, interaction coordinates, an interaction type (e.g., click, swipe, scroll, tap, etc.), and an indication of an actionable object with which the interaction occurred. Thus, each client device 220 can enable a user to interact with and/or select one or more actionable objects presented as part of graphical user interfaces to carry out various functionalities as described herein.

The client devices 220 can each execute one or more client applications, which can include a web browser or a native application that presents educational content (e.g., the media content 270, the labels 280, etc.) provided by the educational content system 205. The one or more client applications can cause the display device of one or more client devices 220 to present a user interface that includes the media content 270, including presentation slides, word documents, online questions, or electronic textbooks, among others. The application can be a web application (e.g., provided by the educational content system 205 via the network 210, etc.), a native application, an operating system resource, or some other form of executable instructions. In some implementations, the client application can include a local application (e.g., local to a client device 220), hosted application, Software as a Service (SaaS) application, virtual application, mobile application, and other forms of content. In some implementations, the application can include or correspond to applications provided by remote servers or third party servers. In some implementations, the application can access the items of media content 270 maintained by the database 215, and generate a user interface that displays one or more of the items of media content 270 on the display device of the client device 220 on which the client application is executing. In some implementations, the user interface can include one or more actionable objects that correspond to multiple choice question answers presented as part of the media content 270. In some implementations, the actionable object can be a "fill-in-the-blank" box that can accept user input, and transmit the input to the educational content system 205 for storage or further processing. Such actionable objects can include user-selectable hyperlinks, buttons, graphics, videos, images, or other application features that generate a signal that is processed by the application executing on the respective client device 220.

In some implementations, one or more client devices 220 can establish one or more communication sessions with the educational content system 205. The one or more communication systems can each include an application session (e.g., virtual application), an execution session, a desktop session, a hosted desktop session, a terminal services session, a browser session, a remote desktop session, a URL session and/or a remote application session. Each communication session can include encrypted and/or secure sessions, which can include an encrypted file, encrypted data or traffic.

Each of the client devices 220 can be computing devices configured to communicate via the network 210 to access information resources (e.g., the media content 270, etc.), including web pages via a web browser, or application resources via a native application executing on a client device 220. When accessing the information resources, the client device 220 can execute instructions (e.g., embedded in the native applications, or a script in the information resources, etc.) that cause the client device 220 to display the media content 270, which can include images, video, audio, quiz or exam questions, practice questions, or other types of educational content. As described herein, the client device 220 can transmit one or more requests for educational content to the educational content system 205, and can receive one or more responses that include the requested media content 270. An educational content request can include, for example, a request for a lesson, a request for a question, a request for an information resource related to a topic, or a request for information specified in a query, among others.

In response to interactions with the various user interface elements, the client devices 220 can transmit information, such as account information (e.g., changing account parameters, changing login information, etc.), interaction information, selections of question answers, provided answers to questions, selections of topics, categories, or lesson-based information, or other signals to the educational content system 205. Generally, the client devices 220 can request and display educational content (e.g., the media content 270, etc.) received from the educational content system 205. The requests can include, for example, a request to access information from an educational lesson provided by the provider device 260, or information related to one or more queries provided by the client devices 220. The request can be a hypertext transfer protocol (HTTP or HTTPS) request message, a file transfer protocol message, an email message, a text message, or any other type of message that can be transmitted via the network 210.

The provider device 260 can include at least one processor and a memory, e.g., a processing circuit. The memory can store processor-executable instructions that, when executed by the processor, cause the processor to perform one or more of the operations described herein. The processor can include a microprocessor, an application-specific integrated circuit (ASIC), a field-programmable gate array (FPGA), etc., or combinations thereof. The memory can include, but is not limited to, electronic, optical, magnetic, or any other storage or transmission device capable of providing the processor with program instructions. The memory can further include a floppy disk, CD-ROM, DVD, magnetic disk, memory chip, ASIC, FPGA, read-only memory (ROM), random-access memory (RAM), electrically erasable programmable ROM (EEPROM), erasable programmable ROM (EPROM), flash memory, optical media, or any other suitable memory from which the processor can read instructions. The instructions can include code from any suitable computer programming language. The provider device 260 can include one or more computing devices or servers that can perform various functions as described herein. The provider device 260 can include any or all of the components and perform any or all of the functions of the computer system 100 described herein in conjunction with FIGS. 1A-1D. The client devices 220 can be, or can be similar to, the client devices 102 described herein above in conjunction with FIGS. 1A-1D.

The provider device 260 can be substantially similar to one or more of the client devices 220 described herein above, and can include any of the hardware components of the client devices 220, as well as perform any of the functionalities of the client devices 220 as described herein. In addition, the provider device 260 can communicate with the educational content system 205 to provide one or more items of media content 270. As described herein, the media content 270 can sometimes be referred to, or can be included in, an information resource (e.g., another item of media content 270, etc.). The provider device 260 can be operated by one or more educators or educational content creators, and can provide the media content 270 to the educational content system 205 via the network 210. The media content 270 can also be provided to the educational content system 205 from a content source (not pictured) via the network 210. In some implementations, the provider device 260 can provide the media content 270 to the educational content system 205 in a request to add an item of the media content 270 to the database 215.

In some implementations, the provider device 260 can provide the media content 270 to the educational content system 205 in a request to generate one or more labels for the item of the media content 270. In some implementations, the request can include a set of candidate labels that can potentially be assigned to the item of media content 270. In some implementations, the set of candidate labels can be transmitted by one or more computing devices (e.g., the provider device 260, the client device 220, etc.) to the educational content system 205 for storage in the database 215. In some implementations, the provider device 260 or another computing device (e.g., the client device 220, etc.) can provide a syllabus to the educational content system, from which the set of candidate labels can be extracted. A request to generate labels for an item of the media content 270 can specify one or more request attributes, or one or more attributes that correspond to the item of media content 270 that should also be associated with any labels that will be assigned to the item of media content 270 by the educational content system 205. In some implementations, the request to generate one or more labels to an item of the media content 270 can further specify an identifier of an item of media content 270, which the educational content system 205 may have already maintained in the database 215. In some implementations, the provider device 260 can transmit the item of media content 270 as part of the request. In some implementations, the educational content system 205 can automatically select a candidate set of labels 280 for the item of media content 270 based on the contents (e.g., text information, images, videos, audio, etc.) of the item of media content 270.

In some implementations, the provider device 260 can execute one or more applications, such as a web browser or a native application, which presents a user interface that allows a user (e.g., an educator or an educational content provider, etc.) to transmit media content 270 to the educational content system 205. The user interface can further include features that allow a user to select or otherwise specify a set of candidate labels that can be assigned to the media content 270 by the educational content system 205. In addition, the user interface can further include features that allow a user to select or otherwise specify one or more request attributes, as described herein. The provider device 260 can access the media content 270 maintained by the educational content system 205, causing the educational content system 205 to transmit a selected item of media content 270 for display in the user interface of the provider device 260. In some implementations, the provider device 260 can transmit a request for a list of sets of candidate labels 280 to the educational content system 205, which can transmit a response message including the list of sets of candidate labels 280 to the provider device 260 for display (e.g., in the user interface as one or more actionable objects, etc.). A user of the provider device 260 can make a selection from the list of sets of candidate labels 280, causing the provider device 260 to transmit a message to the educational content system 205 specifying the one or more sets of candidate labels 280 to potentially use in generating labels for the item of media content 270. The sets of candidate labels 280 can correspond to one or more topic hierarchies, one or more category hierarchies, or one or more syllabi, amongst others.

In some implementations, the request to assign labels to items of media content 270 can include a selection of one or more items of the media content 270 maintained by the educational content system 205, such that the request specifies that each item of media content 270 identified in the request should be assigned one or more respective labels 280. To select an item of media content 270, the provider device 260 can transmit one or more requests for items of media content 270. The educational content system 205 can transmit a list of the requested media content 270, from which the provider device 260 can make selections regarding the which items of media content 270 should be assigned labels by transmitting one or more label assignment requests, as described herein above. For example, the label assignment request can specify one or more items of media content 270, and one or more request attributes, for example, for each item of media content 270 specified in the request.

The user interfaces presented on the display device of the provider device 260 can provide a user with access to each of the media content 270, the media embeddings 275, the labels 280, the label attributes 285, and the label embeddings 290. In some implementations, the provider device 260 can access only the media content 270, the media embeddings 275, the labels 280, the label attributes 285, and the label embeddings 290, which the provider device 260 is authorized to access. For example, the provider device 260 can access the functionality of the educational content system 205 by first entering login credentials or other identification information that identifies an account of the provider device 260 that is maintained by the educational content system 205. The account can be associated with certain media content 270, media embeddings 275, labels 280, label attributes 285, and label embeddings 290, and which can then be accessed (e.g., requested, displayed, modified, transmitted, deleted, created, etc.) by the provider device 260 in response to the authentication credentials.

The database 215 can be a computer-readable memory that can store or maintain any of the information described herein. The database 215 can maintain one or more data structures, which may contain, index, or otherwise store each of the values, pluralities, sets, variables, vectors, numbers, or thresholds described herein. The database 215 can be accessed using one or more memory addresses, index values, or identifiers of any item, structure, or region maintained in the database 215. The database 215 can be accessed by the components of the educational content system 205, or any other computing device described herein, such as the client devices 220 or the provider device 260, via the network 210. In some implementations, the database 215 can be internal to the educational content system 205. In some implementations, the database 215 can exist external to the educational content system 205, and may be accessed via the network 210. The database 215 can be distributed across many different computer systems or storage elements, and may be accessed via the network 210 or a suitable computer bus interface. The educational content system 205 (or the components thereof) can store, in one or more regions of the memory of the educational content system 205, or in the database 215, the results of any or all computations, determinations, selections, identifications, generations, constructions, or calculations in one or more data structures indexed or identified with appropriate values. Any or all values stored in the database 215 may be accessed by any computing device described herein, such as the educational content system 205, to perform any of the functionalities or functions described herein. In some implementations, the database 215 can be similar to or include the storage 128 described herein above in conjunction with FIG. 1C. In some implementations, instead of being internal to the educational content system 205, the database 215 can be a distributed storage medium in a cloud computing system, such as the cloud 108 detailed herein in connection with FIG. 1B.

The database 215 can store media content 270, for example, in one or more data structures. The media content 270 can be provided to the educational content system 205 by the provider device 260 as described herein. In some implementations, the media content 270 can be stored in association with an identifier (e.g., an authentication credential, a username, etc.) of the user that provided the media content 270. In some implementations, the media content 270 be, or form a part of, one or more information resources. The media content 270 can include any form of educational media, such as text, images, video, audio, or instructions to display images, video, or text in an information resource. The media content 270 can be stored in association with one or more tags, topics, or category identifiers that indicate the type of information provided by the media content 270. The media content 270 can be stored as individual content items in one or more data structures, and can be stored in association with a timestamp corresponding to the time the item of media content 270 was stored in the database 215.

Each item of media content 270 can be associated with presentation attributes. For example, images can include presentation attributes such as image height, image width, image format (e.g., BMP, PNG, JPEG, SVG, etc.), image bit-depth, and other image attributes. Presentation attributes for videos can include video duration, video codec, sound codec, and video resolution (e.g., width, height, etc.), closed captioning information (e.g., text content, etc.), among others. Presentation attributes for text can include font typeface, font size, text location, text formatting information, and other information. In some implementations, an item of media content 270 can include an identifier to a different item of media content 270. For example, an item of media content 270 can include instructions that cause the item of media content 270 to be presented on an information resource with a second item of media content 270. In some implementations, the presentation attributes of the item of media content 270 can specify a relative position of the item of content to the second item of media content 270 when presented on an information resource (e.g., another item of media content 270, etc.). In some implementations, an item of media content 270 is an information resource, and the presentation attributes can specify a position of the second item of media content 270 when the item of media content 270 is displayed (e.g., as an information resource).

The database 215 can store or maintain one or more media embeddings 275, for example, in one or more data structures. The media embeddings 275 can be stored in association with a respective item of media content 270. Media embeddings 275 can be generated by the educational content system 205, for example, as output from a transformer model. The media embeddings 275 of an item of media content 270 can be stored in association with the item of media content 270. Said another way, the educational content system 205 can generate a media embedding 275 for each item of media content 270 received, for example, from a provider device or another computing device (e.g., a client device 220, etc.). In some implementations, each media embedding 275 can be stored in association with an identifier of the item of content from which the media embedding 275 was generated, and in association with the information resource from which the item of content was analyzed. The embeddings can be an encoded form of text content (e.g., which can be extracted or generated from other types of content, etc.), represented as a real-valued vector. The real-valued vector of a media embedding 275 can encode a "meaning" of a word or term in text content such that words that are closer in the vector space (sometimes referred to herein as the "embeddings space") are expected to be similar in semantic meaning. As such, while each of the media embeddings 275 may be stored in association with a particular item of media content 270, the media embeddings 275 collectively form an embeddings space (e.g., a real-valued vector space that is independent of any content type, etc.). The media embeddings 275 can be stored in one or more data structures in the database 215, and can be generated, accessed, modified, or deleted by the educational content system 205, as described herein.

The database 215 can store or maintain one or more labels 280, for example, in one or more data structures. The sets of the labels 280 can be stored in association with a hierarchy, such as a topic hierarchy. Each of the labels can correspond to a topic, category, or subject, and can be assigned (e.g., stored in association with, etc.) to one or more items of media content 270. In some implementations, the labels 280 can be generated, for example, based on a syllabus or set of topics provided by an educational content provider (e.g., via the provider device 260, etc.). A topic hierarchy can be a set of topics or categories that are stored as a tree data structure, where each overarching topic can be associated with one or more child topics. The entire hierarchy can correspond to a particular subject (e.g., physics, biology, etc.) that the educational content provider uses, for example, as part of a lesson plan or a course. In some implementations, sets of labels 280 can be stored in association with a corresponding overarching topic or category.

The database 215 can store or maintain one or more label attributes 285, for example, in one or more data structures. The label attributes 285 can indicate which topics or categories correspond to a particular label 280. In some implementations, each label attribute 285 can correspond to a respective topic, category, or subject matter. In such implementations, a label 280 can be stored in association with each attribute that corresponds to the label 280, and in association with each attribute of the parent labels 280 in the topic hierarchy of the set of labels 280 to which the label 280 belongs. The label attributes 285 can be provided, for example, by an educational content provider via the provider device 260. The label attributes 285 can be specified when an educational content provider provides one or more sets of the labels 280 to the educational content system 205. In some implementations, the label attributes 285 can be determined by the educational content system 205, for example, by performing semantic analysis on a topic hierarchy, a syllabus, or a set of labels 280 provided to the educational content system. For example, the educational content system 205 can input the labels 280 or a syllabus to a semantic processing model (e.g., a transformer model, etc.), and generate the label attributes 285 based on the output of the model. Once the label's attributes 285 are received or generated by the educational content system 205, the educational content system 205 can store each label attribute 285 in association with the corresponding label 280. A label 280 can be stored in association with more than one label attribute 285, and can be indexed by the label attribute 285 to which it is associated. This can allow a query executed over the database 215 using different label attributes 285 to return each of the labels 280 to which the different label attributes 285 are associated.

The database 215 can store or maintain one or more label embeddings 290, for example, in one or more data structures. The label embeddings 290 can be stored in association with a respective label 280. Label embeddings 290 can be generated by the educational content system 205, for example, as output from a transformer model. The label embeddings 290 of an item of label 280 can be stored in association with the label 280 from which the label embedding 290 was generated. Said another way, the educational content system 205 can generate a label embedding 290 for each label 280 received, for example, from a provider device or another computing device (e.g., a client device 220, etc.), or generated by the educational content system 205. In some implementations, each label embedding 290 can be stored in association with an identifier of the label 280 from which the label embedding 290 was generated. The label embeddings 290 can be an encoded form of text content (e.g., which can be extracted or generated from other types of content, etc.), represented as a real-valued vector. The real-valued vector of a label embedding 290 can encode a "meaning" of a word or term in text content such that words that are closer in the vector space (sometimes referred to herein as the "embeddings space") are expected to be similar in semantic meaning. As such, while each of the label embeddings 290 may be stored in association with a particular label 280, the label embeddings 290 collectively form an embeddings space (e.g., a real-valued vector space that is independent of any content type, etc.). The label embeddings 290 can be stored in one or more data structures in the database 215, and can be generated, accessed, modified, or deleted by the educational content system 205, as described herein. The provider device 260 can access and modify the label embeddings 290, the label attributes 285, the labels 280, the media embeddings 275, and the media content 270, for example, via one or more user interfaces presented on the provider device 260. Each of the components of the educational content system 205 can access, update, or modify the label embeddings 290, the label attributes 285, the labels 280, the media embeddings 275, or the media content 270, to carry out functionalities detailed herein Referring now to the operations of the educational content system 205, the label maintainer 230 can maintain a hierarchical concept tree comprising one or more labels 280. As described herein above, each of the labels 280 can be associated with a set of label attributes 285 and a respective label embedding 290. The labels 280 can be provided by one or more educational content providers, for example, by using a provider device 260 to transmit the one or more labels 280 to the label maintainer 230 via the network 210. In some implementations, the label maintainer 230 can receive the one or more labels 280 via the network 210 and store the labels 280 in the database 215, for example, as part of a hierarchical concept tree. As described herein above, each of the one or more labels 280 can specify a topic, a category, a subject, or a concept. The labels 280 can be stored in a tree data structure, such that labels 280 corresponding to broader concepts can be stored with associations to other labels 280 that correspond to narrower concepts that fall under the broader concept of the parent label 280. Thus, the label maintainer 230 can store the labels 280 in a concept tree, with labels representing broader concepts near the top of the tree, and labels 280 corresponding to the most specific concepts corresponding to the leaf nodes in the tree.

In some implementations, the label maintainer 230 can receive a syllabus from the provider device 260 that defines the hierarchy of topics to which the labels 280 correspond. The syllabus can include an outline of broader concepts (e.g., which can be associated with labels 280 near the top of the tree) under which other narrower concepts are defined (e.g., which can be associated with labels 280 that correspond to lower nodes or leaf nodes, etc.). The label maintainer 230 can extract each of the concepts defined by the provider device 260 in the syllabus by copying the concepts as labels 280 and storing the labels 280 in the database 215. In doing so, the label maintainer 230 can preserve any associations between labels (e.g., the hierarchy, etc.) by storing corresponding associations between the labels 280 in the database 215. In addition, the label maintainer can store an association between one or more label attributes 285 and a corresponding label. The label attributes 285 can include attributes that define a semantic meaning of content, such as characteristics of the concept to which the label 280 corresponds. Each label 280 can be indexed by the one or more label attributes 285 stored in the database 215 in association with the respective label 280, such that when a query is executed over the database 215 using label attributes 285, labels 280 associated with the attributes specified in the query are returned.

In some implementations, the label maintainer 230 can determine one or more label attributes 285 for each of label 280 based on the contents of the syllabus. For example, the syllabus can include one or more passages of text content that correspond to each label (e.g., a brief description, etc.). Using a semantic processing model, the label maintainer 230 can process the text information corresponding to extract one or more words or phrases that are related to one or more concepts represented by the label 280. The semantic processing model can be, for example, a transformer model that outputs annotations for one or more words in the text information. The label maintainer 230 can store the label attributes in association with the respective label 280, such that the label 280 can be queried by the label attributes 285. In addition, the label maintainer 230 can store each label in association with a label embedding 290. As described herein above, a label embedding 290 can be an encoded form of text content (e.g., which can be extracted or generated from other types of content, etc.), represented as a real-valued vector. The real-valued vector of a label embedding 290 can encode a "meaning" of a word or term in text content (e.g., the label, etc.) such that words that are closer in the vector space (sometimes referred to herein as the "embeddings space") are expected to be similar in semantic meaning.

The label maintainer 230 can generate the label embedding 290, for example, upon receiving or extracting a label 280 as described herein above. The label maintainer 230 can generate the label embedding 290 using an embedding model, such as a transformer model. The transformer model can be, for example, a Bidirectional Encoder Representations from Transformer (BERT) model, which can include an input layer and many hidden layers. The transformer model can include one or more encoders, and can take a sequence of words as input (e.g., a sentence, etc.) and generate real-valued vector representation for the sequence that maintains the semantic importance of each word (e.g., a token, etc.) in the sentence in vector form. These vector representations can be stored as the label embeddings 290. Put simply, an embedding, such as the label embeddings 290 described herein, is a numerical model of the input sentence. A label embedding 290 generated by the transformer model can model the semantic importance of a word in a sentence in a numeric format. Because label embeddings 290 are numerical in format, mathematical operations can be performed on the label embeddings 290. The label maintainer 230 can generate the label embeddings 290 by inputting the label 280 to the transformer model, and extracting one or more vectors the hidden layers in the transformer model. In some implementations, the label maintainer 230 can generate label embeddings 290 for textual content in multiple languages. For example, if label 280 is specified in a syllabus in multiple languages, the label maintainer 230 can generate label embeddings 290 for each language, and store the each of the label embeddings 290 in association with an identifier of the corresponding label 280 and an identifier of the language to which the label embeddings 290 corresponds. The label maintainer 230 can repeat this process by generating label embeddings 290 for each of the labels 280 provided by the provider device 260 or extracted from a syllabus or other source of information.

The request receiver 235 can receive a request to generate labels for an item of media content 270 from a provider device 260. The request can include a request attribute, which can be used to query the labels 280 stored in the database 215. The request attributes can be one or more attributes that correspond to the item of media content 270 that should also be associated with any labels 280 that can potentially be assigned to the item of media content 270. The request attributes can define a semantic meaning of content or labels, and can be used to specify generally what category, subject, or type of information should be used to label the item of media content 270. In some implementations, the request to generate labels for the item of media content 270 can include an identifier of the item of media content 270 to which labels 280 should be assigned. The identified item of media content 270 can be, for example, previously stored in the database 215. In some implementations, the request to generate (e.g., assign, etc.) labels 280 for the item of media content can be included in a request to add an item of media content 270 to the database 215. Such a request can be received, for example, from the provider device 260. Upon receiving a request to add an item of media content 270 to the database, the request receiver 235 can store the item of media content 270 in the database 215, for example, in one or more data structures.

The media embeddings generator 240 can generate a one or more media embeddings 275 for the item of media content using a gated categorical model. To do so, the media embeddings generator 240 can use a transformer model to generate one or more embeddings, as described herein above. In some implementations, the transformer model can be an unsupervised model. The transformer model can include one or more encoders, and can take a sequence of words as input (e.g., a sentence, etc.), one or more pixels of an image, or audio stream data from an audio stream, and generate real-valued vector representation for the input data that maintains the semantic importance of the information in vector form. These vector representations can be stored as initial embeddings for the media content. The initial embeddings can be a numerical model of the input media content 270. An initial embedding generated by the transformer model can model the semantic meaning of an item of media content 270 in a numeric format. Because the initial embeddings are numerical in format, mathematical operations can be performed on the initial embeddings. The media embeddings generator 240 can generate the initial embeddings by inputting the item of media content 270 to the transformer model and extracting one or more vectors from the transformer model. After generating the initial embedding for the item of media content, the media embeddings generator 240 can input the initial embeddings to a gated categorical model of width k (e.g., the width of the initial embeddings, etc.). The gated categorical model can be trained such that the output of the gated categorical model can be equivalent to embedding the labels 280 (e.g., the label embeddings 290, etc.) in the same embedding space as the media embeddings 275. A similarity score can be computed between a label 280 and an item of media content 270 as a function of their respective embeddings.

In some implementations, the media embeddings generator 240 can train the gated categorical model using a set of training data. The training data can include one or more documents (e.g., media content 270, etc.) each associated with one or more known labels 280. Training the gated categorical model can take place using techniques similar to those used to train deep neural networks, in which an input with a known output (e.g., known set of labels, etc.) is fed into the gated categorical model to produce a candidate output. The candidate output is then compared to the known output, and the differences between the known output and the candidate output are back-propagated through the neurons in the deep neural network to minimize a loss function. The known outputs can be produced, for example, from documents (e.g., items of media content 270, etc.) that are already assigned to a set of labels. Similarly, feedback information from the provider device 260 can be used to train the gated categorical model in a similar manner. For example, once an item of media content has been assigned one or more labels 280, the educational content system 205 can transmit the one or more labels to the provider device 260. The provider device 260 can present the one or more labels 280 in one or more user interfaces, with one or more actionable objects corresponding to the one or more labels 280. A user of the provider device 260 can use the actionable objects to confirm whether any of the one or more labels 280 are appropriate for the item of media content 270, and optionally select additional labels to assign to the item of media content 270. The selections of the appropriate labels, which may include the additional labels to assign to the item of media content 270, can be used as the "known" output for the item media content 270 for the training process outlined above, and can be transmitted to the educational content system 205 by the provider device as described herein. Thus, the gated categorical model can be continuously trained as media content 270 is assigned one or more labels 280, thereby improving the model over time.

Once media embeddings 275 have been generated for the specified item of media content, the label selector 245 can select a subset of the labels 280 based on the request attribute. As described herein above, each of the labels 280 can be stored in association with one or more label attributes 285. Each of the label attributes 285 correspond to a concept represented by the label 280. The labels 280 can be stored in the database 215 such that each label 280 is indexed by each label attribute 285 associated with the respective label 280. Said another way, each label 280 can be retrieved from the database 215 by querying one or more label attributes 285 over the database 215. The labels 280 retrieved from the database 215 will be the labels 280 that are associated with label attributes 285 that were specified in the query. When the provider device 260 transmits a request to assign one or more labels 280 to an item of media content 270, the request can include one or more request attributes. The request attributes can be any of the label attributes 285 stored in the database 215, and can correspond to concepts, categories, subjects, or any other attribute (e.g., physics, biology, mathematics, etc.). In some implementations, the request attributes can be extracted from the item of media content 270. The label selector 245 can select a subset of candidate labels that can potentially be assigned to the item of media content 270 by accessing labels 280 that have label attributes 285 that correspond to the request attributes. To do so, the label selector 245 can execute a query in the database 215 over the label attributes 285 of each label 280 the one or more request attributes. The query can be any sort of database query, such as a structured query language (SQL) query. The label selector 245 can execute the query over the label attributes 285 in the database 215 and retrieve the labels 280 associated with each of the label attributes 285 matching one or more of the request attributes. The label selector 245 can store the retrieved labels 280 in one or more data structures in the memory of the educational content system 205. The labels 280 retrieved using the query can be a subset of the labels 280 stored in the database 215.

The label score determiner 250 can determine a respective label score for each of the subset of the labels 280 retrieved based on the query. The label score can be a numerical measure of how closely the semantic meaning of a label 280 matches that of an item of media content 270. To calculate this numerical measure, the label score determiner 250 can calculate a similarity between the media embeddings 275 generated using the gated categorical model on the item of media content and the label embeddings 290 of each label in the subset. Said another way, for a particular label, the label score can be calculated as the similarity between the label embeddings 290 associated with the label and the media embedding 275 associated with the item of media content 270. Recall that both the media embeddings 275 and the label embeddings are stored as a lower dimensional vector representation of the input (e.g., the media content 270 and the label 280, respectively). Thus, the label score determiner 250 can compute the similarity as a function of the media embeddings 275 and the label embeddings 290. Generally, the label score can represent the overall relevancy of the label 280 to the item of media content 270. The result can be a scalar value, and can be stored as the respective label score in association with the respective item of media content 270 and the respective label 280.

After the label scores have been calculated for each label 280 of the subset of labels 280 retrieved from the database 215, the label communicator 255 can provide a selected label 280 of the subset of labels 280 retrieved from the database 215 based on the calculated label scores. To select a label 280 from the subset, the label communicator can rank each label 280 in the subset with the respective label score of each label 280 in the subset. For example, the label communicator 255 can store each label 280 the subset in association with the respective label score for that label 280 in a list. The label communicator can then rank, sort, or otherwise reorder entries in the list by the label scores. In some implementations, the label communicator 255 can sort the labels 280 in the list as having the lowest label score first in the list, and the highest label score last in the list. In some implementations, the label communicator 255 can sort the labels 280 in the list as having the largest label score first in the list, and the lowest label score last in the list. Once the list has been sorted, the label communicator 255 can select a predetermined number of top ranking (e.g., a predetermined number of entries from the start of the list that are ranked higher than other labels 280 in the list, etc.) the list as a second subset of the labels 280 retrieved from the database 215. Thus, the second subset represents the top M (e.g., a predetermined number, etc.) labels 280 that the educational content system 205 determines are most relevant to the item of media content. In some implementations, the label communicator 255 selects only the top ranking (e.g., the first entry in the list, etc.) label 280 from the sorted list of labels 280. The label communicator 255 can then transmit one or more messages including the selected label(s) 280 to the provider device 260 that transmitted the request to assign one or more labels 280 to the item of media content 270. The label communicator 255 can store the one or more selected labels 280 in association with the item of media content 270.

In some implementations, upon receiving the one or more selected labels 280 from the label communicator 255, the provider device 260 can present the one or more labels 280 in one or more user interfaces on the display of the provider device, with one or more actionable objects corresponding to the one or more labels 280. A user of the provider device 260 can use (e.g. interact with, etc.) the actionable objects to confirm whether any of the one or more labels 280 are appropriate for the item of media content 270, and optionally select additional labels to assign to the item of media content 270. Upon selecting the labels 280 that the user deems appropriate for the item of media content 270, the provider device 260 can transmit one or more messages including the selected labels 280 to the label communicator 255, which can also include indications of the labels 280 that were selected for the item of media content 270 but not selected by the user of the provider device 260. As described herein above, the educational content system 205 can use this information as feedback for training the gated categorical model. Upon receiving the selected labels from the provider device 260, the label communicator 255 can store an association between the item of media content 270 and the one or more selected labels 280 received from the provider device 260.

Figure 3:
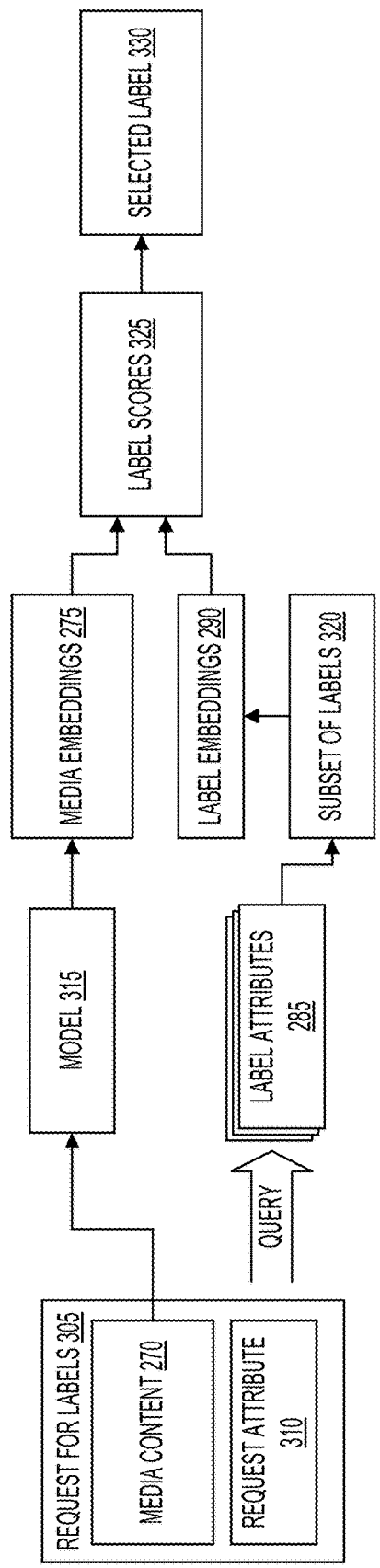
FIG. 3 illustrates an example data flow diagram of generating labels for an item of media content, in accordance with one or more implementations.

Referring now to FIG. 3, illustrated is an example data flow diagram 300 showing the assignment of (e.g., assigning, etc.) labels 280 to an item of media content 270. As shown, a request for labels 305 (e.g., transmitted by a provider device, etc.) can include an identification of one or more items of media content 270 and a request attribute 310. Using the gated categorical model 315, the media content 270 can be translated into the media embeddings 275. As described herein, the media embeddings 275 can be a lower dimensional vector representation of the item of media content 270. The request attributes 310 can be used to query over the label attributes 285 stored in the database 215. Recall the label attributes 285 can each represent a concept, subject, topic, or a characteristic of each corresponding label 280 stored in the database 215. Each label 280 can be stored in association with one or more label attributes 285. The query over the label attributes 285 using the request attribute (s) 310 can return a subset of labels 320 that are associated with label attributes 285 that match one or more of the request attribute(s) 310. Thus, the subset of labels 320 can include each label 280 having at least one label attribute 285 that matches at least one of the request attributes 310 in the request for labels 305.

Next, label embeddings 290 can be generated for each of the labels 280 in the subset of labels 320, as described herein. The label embeddings 290 can each correspond to a respective one of the labels 280 in the subset of labels 320, and can be stored in association with the respective label 280 in the database 215. The label embeddings 290 for the subset of labels 320 can be used, along with the media embeddings 275, to compute a label score 325 for each label 280 in the subset of labels 320. To do so, as described herein, a similarity can be determined between each of the label embeddings 290 of each label 280 in the subset of labels 320 and the media embedding 275 for the item of media content 270 identified in the request for labels 305. The result can be stored in association with the item of media content 270 and the respective label 280. The label scores can be assembled in a ranked list based on the label scores 325, as described herein, and a predetermined number of top ranking labels 280 can be selected from the list as the selected label(s) 330. The selected label(s) 330 are those that are selected for assignment to the item of media content 270 identified in the request for labels 305, and can be returned to the provider device 260 that transmitted the request for labels 305.

Figure 4:
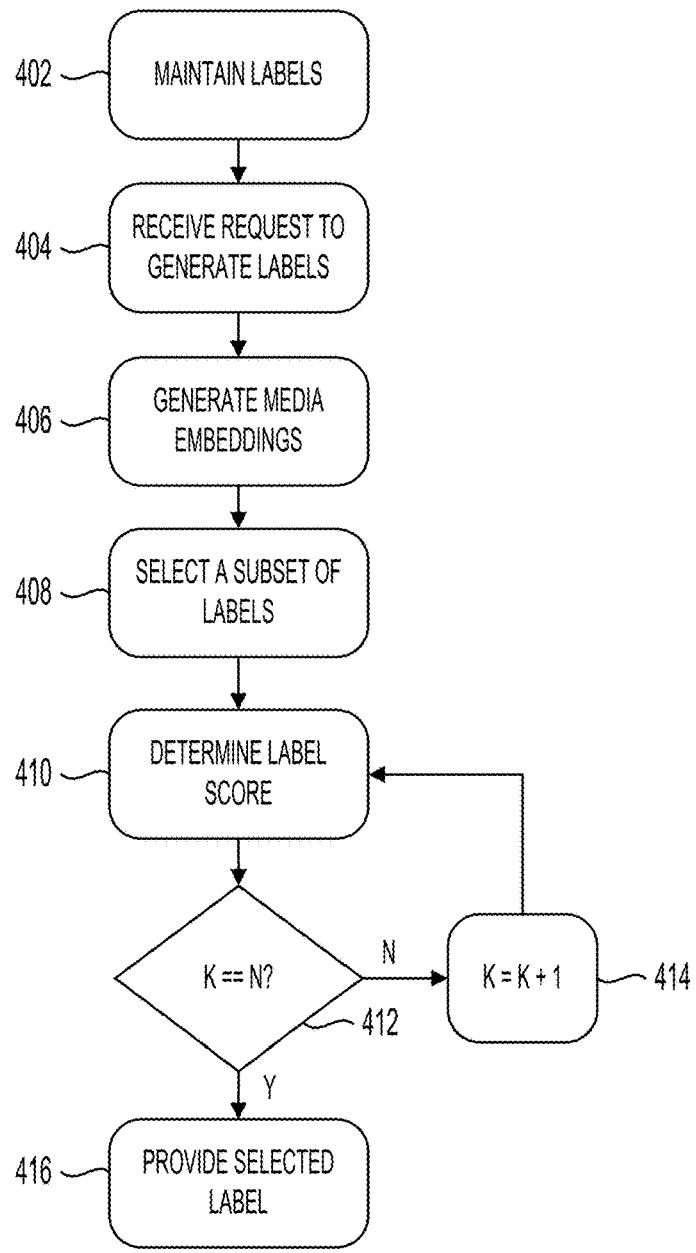
FIG. 4 illustrates an example flow diagram of a method of building an inventory database with automatic labeling, in accordance with one or more implementations.

Referring now to FIG. 4, depicted is an illustrative flow diagram of a method 400 for building an inventory database with automatic labeling. The method 400 can be executed, performed, or otherwise carried out by the educational content system 205, the computer system 100 described herein in conjunction with FIGS. 1A-1D, or any other computing devices described herein. In a brief overview of method 400, the educational content system (e.g., the educational content system 205, etc.) can maintain one or more labels (e.g., the labels 280, etc.) (STEP 402), receive a request to generate (e.g., assign, etc.) labels to an item of media content (e.g., the media content 270, etc.) (STEP 404), generate media embeddings (e.g., the media embeddings 275, etc.) for the item of media content (STEP 406), select a subset of the labels (STEP 408), determine a label score (STEP 410), determine whether the counter register k is equal to the number of labels in the subset n (STEP 412), increment the counter register k (STEP 414), and provide one or more selected labels (STEP 414).

In further detail of method 400, the educational content system (e.g., the educational content system 205, etc.) can maintain one or more labels (e.g., the labels 280, etc.) (STEP 402). Each of the labels 280 can be associated with a set of label attributes (e.g., the label attributes 285, etc.) and a respective label embedding (e.g., a label embedding 290, etc.). The labels can be provided by one or more educational content providers, for example, by using a provider device (e.g., the provider device 260, etc.) to transmit the one or more labels to the educational content system via a network (e.g., the network 210, etc.). In some implementations, the educational content system can receive the one or more labels via the network and store the labels in a database (e.g., the database 215, etc.), for example, as part of a hierarchical concept tree. As described herein above, each of the one or more labels can specify a topic, a category, a subject, or a concept. The labels can be stored in a tree data structure, such that labels corresponding to broader concepts can be stored with associations to other labels that correspond to narrower concepts that fall under the broader concept of the parent label. Thus, the educational content system can store the labels in a concept tree, with labels representing broader concepts near the top of the tree, and labels corresponding to the most specific concepts corresponding to the leaf nodes in the tree.

In some implementations, the educational content system can receive a syllabus from the provider device that defines the hierarchy of topics to which the labels correspond. The syllabus can include an outline of broader concepts (e.g., which can be associated with labels near the top of the tree) under which other narrower concepts are defined (e.g., which can be associated with labels that correspond to lower nodes or leaf nodes, etc.). The educational content system can extract each of the concepts defined by the provider device in the syllabus by copying the concepts as labels and storing the labels in the database. In doing so, the educational content system can preserve any associations between labels (e.g., the hierarchy, etc.) by storing corresponding associations between the labels in the database. In addition, the educational content system can store an association between one or more label attributes and a corresponding label. The label attributes can include attributes that define a semantic meaning of content, such as characteristics of the concept to which the label corresponds. Each label can be indexed by the one or more label attributes stored in the database in association with the respective label, such that when a query is executed over the database using label attributes, labels associated with the attributes specified in the query are returned.

In some implementations, the educational content system can determine one or more label attributes for each label based on the contents of the syllabus. For example, the syllabus can include one or more passages of text content that correspond to each label (e.g., a brief description, etc.). Using a semantic processing model, the educational content system can process the text information corresponding to extract one or more words or phrases that are related to one or more concepts represented by the label. The semantic processing model can be, for example, a transformer model that outputs annotations for one or more words in the text information. The educational content system can store the label attributes in association with the respective label, such that the label can be queried by the label attributes. In addition, the educational content system can store each label in association with a label embedding. As described herein above, a label embedding can be an encoded form of text content (e.g., which can be extracted or generated from other types of content, etc.), represented as a real-valued vector. The real-valued vector of a label embedding can encode a "meaning" of a word or term in text content (e.g., the label, etc.) such that words that are closer in the vector space (sometimes referred to herein as the "embeddings space") are expected to be similar in semantic meaning.

The educational content system can generate the label embedding, for example, upon receiving or extracting a label as described herein above. The educational content system can generate the label embedding using an embedding model, such as a transformer model. The transformer model can be, for example, a Bidirectional Encoder Representations from Transformer (BERT) model, which can include an input layer and many hidden layers. The transformer model can include one or more encoders, and can take a sequence of words as input (e.g., a sentence, etc.) and generate real-valued vector representation for the sequence that maintains the semantic importance of each word (e.g., a token, etc.) in the sentence in vector form. These vector representations can be stored as the label embeddings. Put simply, an embedding, such as the label embeddings described herein, is a numerical model of the input sentence. A label embedding generated by the transformer model can model the semantic importance of a word in a sentence in a numeric format. Because label embeddings are numerical in format, mathematical operations can be performed on the label embeddings. The educational content system can generate the label embeddings by inputting the label to the transformer model, and extracting one or more vectors the hidden layers in the transformer model. In some implementations, the educational content system can generate label embeddings for textual content in multiple languages. For example, if label is specified in a syllabus in multiple languages, the educational content system can generate label embeddings for each language, and store the each of the label embeddings in association with an identifier of the corresponding label and an identifier of the language to which the label embeddings corresponds. The educational content system can repeat this process by generating label embeddings for each of the labels provided by the provider device or extracted from a syllabus or other source of information.

The educational content system can receive a request to generate (e.g., assign, etc.) labels to an item of media content (e.g., the media content 270, etc.) (STEP 404). The request can include a request attribute, which can be used to query the labels stored in the database. The request attributes can be one or more attributes that correspond to the item of media content that should also be associated with any labels that can potentially be assigned to the item of media content. The request attributes can define a semantic meaning of content or labels, and can be used to specify generally what category, subject, or type of information should be used to label the item of media content. In some implementations, the request to generate labels for the item of media content can include an identifier of the item of media content to which labels should be assigned. The identified item of media content can be, for example, previously stored in the database. In some implementations, the request to generate (e.g., assign, etc.) labels for the item of media content can be included in a request to add an item of media content to the database. Such a request can be received, for example, from the provider device. Upon receiving a request to add an item of media content to the database, the educational content system can store the item of media content in the database, for example, in one or more data structures.

The educational content system can generate media embeddings (e.g., the media embeddings 275, etc.) for the item of media content (STEP 406). To do so, the educational content system can use a transformer model to generate one or more embeddings, as described herein above. In some implementations, the transformer model can be an unsupervised model. The transformer model can include one or more encoders, and can take a sequence of words as input (e.g., a sentence, etc.), one or more pixels of an image, or audio stream data from an audio stream, and generate real-valued vector representation for the input data that maintains the semantic importance of the information in vector form. These vector representations can be stored as initial embeddings for the media content. The initial embeddings can be a numerical model of the input media content. An initial embedding generated by the transformer model can model the semantic meaning of an item of media content in a numeric format. Because the initial embeddings are numerical in format, mathematical operations can be performed on the initial embeddings. The educational content system can generate the initial embeddings by inputting the item of media content to the transformer model and extracting one or more vectors from the transformer model. After generating the initial embedding for the item of media content, the educational content system can input the initial embeddings to a gated categorical model of width k (e.g., the width of the initial embeddings, etc.). The gated categorical model can be trained such that the output of the gated categorical model can be equivalent to embedding the labels (e.g., the label embeddings 290, etc.) in the same embedding space as the media embeddings. A similarity score can be computed between a label and an item of media content as a function of their respective embeddings.

In some implementations, the educational content system can train the gated categorical model using a set of training data. The training data can include one or more documents (e.g., media content, etc.) each associated with one or more known labels. Training the gated categorical model can take place using techniques similar to those used to train deep neural networks, in which an input with a known output (e.g., known set of labels, etc.) is fed into the gated categorical model to produce a candidate output. The candidate output is then compared to the known output, and the differences between the known output and the candidate output are back-propagated through the neurons in the deep neural network to minimize a loss function. The known outputs can be produced, for example, from documents (e.g., items of media content, etc.) that are already assigned to a set of labels. Similarly, feedback information from the provider device can be used to train the gated categorical model in a similar manner. For example, once an item of media content has been assigned one or more labels, the educational content system 205 can transmit the one or more labels to the provider device. The provider device can present the one or more labels in one or more user interfaces, with one or more actionable objects corresponding to the one or more labels. A user of the provider device can use the actionable objects to confirm whether any of the one or more labels are appropriate for the item of media content, and optionally select additional labels to assign to the item of media content. The selections of the appropriate labels, which may include the additional labels to assign to the item of media content, can be used as the "known" output for the item media content for the training process outlined above, and can be transmitted to the educational content system 205 by the provider device as described herein. Thus, the gated categorical model can be continuously trained as media content is assigned one or more labels, thereby improving the model over time.

The educational content system can select a subset of the labels (STEP 408). Once media embeddings have been generated for the specified item of media content, the educational content system can select a subset of the labels based on the request attribute. As described herein above, each of the labels can be stored in association with one or more label attributes. Each of the label attributes correspond to a concept represented by the label. The labels can be stored in the database such that each label is indexed by each label attribute associated with the respective label. Said another way, each label can be retrieved from the database by querying one or more label attributes over the database. The labels retrieved from the database will be the labels that are associated with label attributes that were specified in the query. When the provider device 260 transmits a request to assign one or more labels to an item of media content, the request can include one or more request attributes. The request attributes can be any of the label attributes stored in the database, and can correspond to concepts, categories, subjects, or any other attribute (e.g., physics, biology, mathematics, etc.).

In some implementations, the request attributes can be extracted from the item of media content. The educational content system can select a subset of candidate labels that can potentially be assigned to the item of media content by accessing labels that have label attributes that correspond to the request attributes. To do so, the educational content system can execute a query in the database over the label attributes of each label and the one or more request attributes. The query can be any sort of database query, such as a structured query language (SQL) query. The educational content system can execute the query over the label attributes in the database and retrieve the labels associated with each of the label attributes matching one or more of the request attributes. The educational content system can store the retrieved labels in one or more data structures in the memory of the educational content system 205. The labels retrieved using the query can be a subset of the labels stored in the database.

The educational content system can determine a label score (STEP 410). The educational content system can determine a respective label score for each of the subset of the labels retrieved based on the query. The label score can be a numerical measure of how closely the semantic meaning of a label matches that of an item of media content. To calculate this numerical measure, the educational content system can determine a similarity between the media embeddings generated using the gated categorical model on the item of media content and the label embeddings of each label in the subset. Said another way, for a particular label, the label score can be calculated as the similarity between the label embeddings associated with the label and the media embedding associated with the item of media content. Recall that both the media embeddings and the label embeddings are stored as a lower dimensional vector representation of the input (e.g., the media content and the label, respectively). Thus, the educational content system can compute the similarity as a function of the media embeddings and the label embeddings. Generally, the label score can represent the overall relevancy of the label to the item of media content. The result can be a scalar value, and can be stored as the respective label score in association with the respective item of media content and the respective label.

The educational content system can determine whether the counter register k is equal to the number of labels in the subset n (STEP 412). To determine whether a label score has been generated for each label in the subset, the educational content system can compare the counter register k used to track the number calculated label scores to the number of labels in the subset n. If the counter register k is not equal to (e.g., less than) the total number of labels in the subset n, the educational content system can execute (STEP 414). If the counter register k is equal to (e.g., equal to or greater than) the total number of labels in the subset n, the educational content system can execute (STEP 416).

The educational content system can increment the counter register k (STEP 414). To track the total number of labels for which a label score has been generated, the educational content system can add one to the counter register k to indicate the number of label scores generated based on the labels in the subset. After incrementing the value of the counter register k, the educational content system can execute (STEP 410).

The educational content system can provide one or more selected labels (STEP 414). After the label scores have been calculated for each label of the subset of labels retrieved from the database 215, the educational content system can provide a selected label of the subset of labels retrieved from the database based on the calculated label scores. To select a label from the subset, the educational content system can rank each label in the subset with the respective label score of each label in the subset. For example, the educational content system can store each label's subset in association with the respective label score for that label in a list. The educational content system can then rank, sort, or otherwise reorder entries in the list by the label scores. In some implementations, the educational content system can sort the labels in the list as having the lowest label score first in the list, and the highest label score last in the list. In some implementations, the educational content system can sort the labels in the list as having the largest label score first in the list, and the lowest label score last in the list. Once the list has been sorted, the educational content system can select a predetermined number of top ranking (e.g., a predetermined number of entries from the start of the list that are ranked higher than other labels in the list, etc.) the list as a second subset of the labels retrieved from the database. Thus, the second subset represents the top M (e.g., a predetermined number, etc.) labels that the educational content system determines are most relevant to the item of media content. In some implementations, the educational content system selects only the top ranking (e.g., the first entry in the list, etc.) label from the sorted list of labels. The educational content system can then transmit one or more messages including the selected label(s) to the provider device that transmitted the request to assign one or more labels to the item of media content. The educational content system can store the one or more selected labels in association with the item of media content.

In some implementations, upon receiving the one or more selected labels from the educational content system, the provider device can present the one or more labels in one or more user interfaces on the display of the provider device, with one or more actionable objects corresponding to the one or more labels. A user of the provider device can use (e.g. interact with, etc.) the actionable objects to confirm whether any of the one or more labels are appropriate for the item of media content, and optionally select additional labels to assign to the item of media content. Upon selecting the labels that the user deems appropriate for the item of media content, the provider device can transmit one or more messages including the selected labels to the educational content system, which can also include indications of the labels that were selected for the item of media content but not selected by the user of the provider device. As described herein above, the educational content system can use this information as feedback for training the gated categorical model. Upon receiving the selected labels from the provider device, the educational content system can store an association between the item of media content and the one or more selected labels received from the provider device.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs, e.g., one or more components of computer program instructions, encoded on computer storage medium for execution by, or to control the operation of, data processing apparatus. The program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can include a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The terms "data processing apparatus", "data processing system", "client device", "computing platform", "computing device", or "device" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The elements of a computer include a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), for example. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), plasma, or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can include any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system such as the educational content system 205 can include clients and servers. For example, the educational content system 205 can include one or more servers in one or more data centers or server farms. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving input from a user interacting with the client device). Data generated at the client device (e.g., a result of an interaction, computation, or any other event or computation) can be received from the client device at the server, and vice-versa.

While this specification contains many specific implementation details, these should not be construed as limitations on the scope of any inventions or of what may be claimed, but rather as descriptions of features specific to particular implementations of the systems and methods described herein. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In some cases, the actions recited in the claims can be performed in a different order and still achieve desirable results. In addition, the processes depicted in the accompanying figures do not necessarily require the particular order shown, or sequential order, to achieve desirable results.

In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. For example, the educational content system 205 could be a single module, a logic device having one or more processing modules, one or more servers, or part of a search engine.

Having now described some illustrative implementations and implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed only in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation, and references to "an implementation," "some implementations," "an alternate implementation," "various implementation," "one implementation" or the like are not necessarily mutually exclusive and are intended to indicate that a particular feature, structure, or characteristic described in connection with the implementation may be included in at least one implementation. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms.

Where technical features in the drawings, detailed description or any claim are followed by reference signs, the reference signs have been included for the sole purpose of increasing the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. Although the examples provided may be useful for generating an inventory database with automatic labeling, the systems and methods described herein may be applied to other environments. The foregoing implementations are illustrative rather than limiting the described systems and methods. The scope of the systems and methods described herein may thus be indicated by the appended claims, rather than the foregoing description, and changes that come within the meaning and range of equivalency of the claims are embraced therein.

What is claimed is:

1. A method of building an inventory database with automatic labeling, comprising:
   maintaining, by one or more processors coupled to memory, a hierarchical concept tree comprising a plurality of labels, each of the plurality of labels associated with a set of attributes and a respective embedding;
   receiving, by the one or more processors, from a provider device, a request to generate labels for an item of media content, the request providing a request attribute;
   generating, by the one or more processors, using a gated categorical model, a plurality of document embeddings for the item of media content;
   selecting, by the one or more processors, a subset of the plurality of labels based on the request attribute;
   determining, by the one or more processors, a respective label score for each label of the subset of the plurality of labels based on the plurality of document embeddings and the respective embedding of the label; and
   providing, by the one or more processors, a selected label of the subset of the plurality of labels based on the respective label score of the selected label.

2. The method of claim 1, further comprising training the gated categorical model, by the one or more processors, using a set of training data comprising a plurality of documents each associated with a respective label of the plurality of labels.

3. The method of claim 1, wherein receiving the request to generate labels for the item of media content further comprises:
   receiving, by the one or more processors, from the provider device, the item of media content; and
   storing, by the one or more processors, the item of media content in a database.

4. The method of claim 1, wherein the plurality of labels are stored in a database indexed by the set of attributes associated with each label of the plurality of labels; and
   wherein selecting the subset of the plurality of labels further comprises executing, by the one or more processors, a query in the database over the set of attributes of each label of the plurality of labels using the request attribute.

5. The method of claim 1, wherein determining the respective label score for each label of the plurality of labels further comprises:
   calculating, by the one or more processors, for each label of the plurality of labels, a similarity between the plurality of document embeddings and the respective embedding of the label; and
   storing, by the one or more processors, for each label of the plurality of labels, the similarity as the respective label score in association with the item of media content and the label.

6. The method of claim 1, wherein maintaining the plurality of labels further comprises:
   receiving, by the one or more processors, from the provider device, a syllabus defining a hierarchy of topics; and
   extracting, by the one or more processors, the plurality of labels from the syllabus based on the hierarchy of topics.

7. The method of claim 6, further comprising determining, by the one or more processors, using a semantic model, the set of attributes associated with each label of the plurality of labels based on the syllabus.

8. The method of claim 1, wherein providing the selected label of the subset of the plurality of labels further comprises:
   providing, by the one or processors to the provider device, a second subset of the subset of the plurality of labels, the respective label score for each label of the second subset being greater than label scores of other labels of the subset of the plurality of labels;
   receiving, by the one or more processors from the provider device, a selection of the selected label from the second subset; and
   storing, by the one or more processors, an association between the selected label and the item of media content.

9. The method of claim 1, wherein providing the selected label further comprises:
   ranking, by the one or more processors, the subset of the plurality of labels based on the respective label score of each label of the subset of the plurality of labels; and
   selecting, by the one or more processors, the selected label from the subset of the plurality of labels based on the ranking.

10. The method of claim 1, wherein providing the selected label further comprises presenting, by the one or more processors, the selected label in a user interface at the provider device.

11. A system for building an inventory database with automatic labeling, comprising:
   one or more processors coupled to a memory, the one or more processors configured to:
      maintain a hierarchical concept tree comprising a plurality of labels, each of the plurality of labels associated with a set of attributes and a respective embedding;
      receive, from a provider device, a request to generate labels for an item of media content, the request providing a request attribute;
      generate, using a gated categorical model, a plurality of document embeddings for the item of media content;
      select a subset of the plurality of labels based on the request attribute;
      determine a respective label score for each label of the subset of the plurality of labels based on the plurality of document embeddings and the respective embedding of the label; and
      provide a selected label of the subset of the plurality of labels based on the respective label score of the selected label.

12. The system of claim 11, wherein the one or more processors are further configured to train, using a set of training data comprising a plurality of documents each associated with a respective label of the plurality of labels, the gated categorical model.

13. The system of claim 11, wherein the one or more processors are further configured to receive the request to generate labels for the item of media content by:
   receiving, from the provider device, the item of media content; and
   storing the item of media content in a database.

14. The system of claim 11, wherein the plurality of labels are stored in a database indexed by the set of attributes associated with each label of the plurality of labels; and
   wherein the one or more processors are further configured to select the subset of the plurality of labels by executing, by the one or more processors, a query in the database over the set of attributes of each label of the plurality of labels using the request attribute.

15. The system of claim 11, wherein the one or more processors are further configured to determine the respective label score for each label of the plurality of labels by:
   calculating, for each of the plurality of labels, a similarity between the plurality of document embeddings and the respective embedding of the label; and
   storing, for each label of the plurality of labels, the similarity as the respective label score in association with the item of media content and the label.

16. The system of claim 11, wherein the one or more processors are further configured to maintain the plurality of labels by:
   receiving, from the provider device, a syllabus defining a hierarchy of topics; and
   extracting the plurality of labels from the syllabus based on the hierarchy of topics.

17. The system of claim 16, wherein the one or more processors are further configured to determine, using a semantic model, the set of attributes associated with each label of the plurality of labels based on the syllabus.

18. The system of claim 11, wherein the one or more processors are further configured to provide the selected label of the subset of the plurality of labels by:
   providing, to the provider device, a second subset of the subset of the plurality of labels, the respective label score of each label of the second subset being greater than label scores of other labels of the subset of the plurality of labels;
   receiving, from the provider device, a selection of the selected label from the second subset; and
   storing an association between the selected label and the item of media content.

19. The system of claim 11, wherein the one or more processors are further configured to provide the selected label by:
   ranking the subset of the plurality of labels based on the respective label score of each label of the subset of the plurality of labels; and
   selecting the selected label from the subset of the plurality of labels based on the ranking.

20. The system of claim 11, wherein the one or more processors are further configured to provide the selected label by presenting, by the one or more processors, the selected label in a user interface at the provider device.

\* \* \* \* \*